United States Patent
Okada et al.

(10) Patent No.: US 8,093,886 B2
(45) Date of Patent: Jan. 10, 2012

(54) ROTATION-ANGLE-DETECTING APPARATUS

(75) Inventors: Yasuyuki Okada, Mishima-gun (JP); Kyohei Aimuta, Mishima-gun (JP); Chiharu Mitsumata, Kumagagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/988,277

(22) PCT Filed: Mar. 26, 2010

(86) PCT No.: PCT/JP2010/055447
§ 371 (c)(1),
(2), (4) Date: Oct. 15, 2010

(87) PCT Pub. No.: WO2010/113820
PCT Pub. Date: Oct. 7, 2010

(65) Prior Publication Data
US 2011/0037459 A1    Feb. 17, 2011

(30) Foreign Application Priority Data
Mar. 30, 2009   (JP) ................................ 2009-081364

(51) Int. Cl.
*G01B 7/30* (2006.01)
(52) U.S. Cl. .......... 324/207.21; 324/207.25; 324/207.12
(58) Field of Classification Search ............. 324/207.21, 324/207.25, 207.12
See application file for complete search history.

(56) References Cited

U.S. PATENT DOCUMENTS

| | | | |
|---|---|---|---|
| 6,326,781 B1 * | 12/2001 | Kunde et al. | ............ 324/207.21 |
| 6,501,678 B1 | 12/2002 | Lenssen et al. | |
| 7,307,415 B2 * | 12/2007 | Seger et al. | ................ 324/207.2 |
| 2006/0103381 A1 * | 5/2006 | Schmollngruber et al. | .. 324/252 |
| 2006/0214656 A1 | 9/2006 | Sudo et al. | |
| 2009/0206827 A1 | 8/2009 | Aimuta et al. | |

FOREIGN PATENT DOCUMENTS

| | | |
|---|---|---|
| JP | 2001-159542 A | 6/2001 |
| JP | 2003-502876 A | 1/2003 |
| JP | 2003-222534 A | 8/2003 |
| JP | 2005-024287 A | 1/2005 |
| JP | 2006-170837 A | 6/2006 |
| JP | 2006-194861 A | 7/2006 |
| JP | 2008-101954 A | 5/2008 |
| JP | 2009-025319 A | 2/2009 |

OTHER PUBLICATIONS

Toshiyuki Ishibashi, et al., "IX type magnetic encoder," Papers of Technical Meeting on Magnetics, IEE Japan, 2005, pp. 43-48, vol. MAG-05—123. English Abstract.

* cited by examiner

*Primary Examiner* — Jay Patidar
(74) *Attorney, Agent, or Firm* — Sughrue Mion, PLLC

(57) ABSTRACT

A rotation-angle-detecting apparatus comprising a magnet rotor, a magnetic sensor detecting the direction of magnetic flux from the magnet rotor, a correction circuit, and an angle-calculating circuit, the magnetic sensor having bridge circuits X and Y each comprising four connected magnetoresistive devices, each magnetoresistive device comprising a spin-valve, giant-magnetoresistive film, the correction circuit calculating difference (Vx−Vy) and sum (Vx+Vy) from the output voltage Vx of the bridge circuit X and the output voltage Vy of the bridge circuit Y, and making their amplitudes equal to each other, and the angle-calculating circuit determining the rotation angle of the rotor by arctangent calculation from a signal (Vx−Vy)' and a signal (Vx+Vy)' supplied with the same amplitude from the correction circuit.

4 Claims, 29 Drawing Sheets

Bridge X

Bridge Y

ROTATION-ANGLE-DETECTING APPARATUS

CROSS REFERENCE TO RELATED APPLICATIONS

This application is a National Stage of International Application No. PCT/JP2010/055447, filed on Mar. 26, 2010, which claims priority from Japanese Patent Application No. 2009-081364, filed on Mar. 30, 2009, the contents of all of which are incorporated herein by reference in their entirety.

FIELD OF THE INVENTION

The present invention relates to a rotation-angle-detecting apparatus comprising a magnetic sensor comprising magnetoresistive devices constituted by spin-valve, giant-magnetoresistive films, with reduced angle error due to the production unevenness, etc. of the magnetic sensor.

BACKGROUND OF THE INVENTION

Magnetic sensors using magnetoresistive devices capable of detecting the change of a rotation angle, etc. without contact are required to have good detection sensitivity to a rotating magnetic field. Used for high-sensitivity magnetoresistive devices is a spin-valve, giant-magnetoresistive (SVGMR) film comprising a pinned layer having magnetization anisotropy (simply called "pinned layer"), a non-magnetic, intermediate layer formed on the pinned layer for cutting magnetic coupling, and a free layer formed on the non-magnetic, intermediate layer and having a magnetization direction rotatable to an arbitrary direction by an external magnetic field. A Wheatstone bridge comprising devices each having the SVGMR film provides a magnetic sensor whose output voltage changes depending on the direction of an external magnetic field.

JP 2001-159542 A discloses a rotation angle sensor comprising substrates comprising magnetoresistive devices, a printed circuit having bridge circuits constituted by connecting the magnetoresistive devices, and a sensor holder supporting the substrate and the printed circuit, the sensor holder having the substrates in a multiple of 4, and at least two substrates being inclined to each other by 80-100° on a printed circuit surface. In this rotation angle sensor, four devices cut out of the same wafer are connected to constitute a bridge. However, this rotation angle sensor fails to absorb unevenness in a wafer plane.

JP 2003-502876 A discloses a method for forming a device having pluralities of magnetic-sensing directions on the same wafer. In this method, after a desired pattern is formed, an external magnetic field is applied to the device while locally heating it by a heater, such that a pinned layer is magnetized in a desired direction. FIGS. 41 and 42 show the arrangement of devices obtained by this method. As shown in FIG. 42 with enlargement, there are devices whose pinned layers have antiparallel magnetization directions in an arrow direction 100, but there are no devices whose pinned layers have antiparallel magnetization directions in an arrow direction 100' perpendicular to the arrow direction 100. Therefore, a bridge circuit with such device arrangement provides only an output having the same phase, failing to obtain a full-bridge output. Also, a device arrangement having an angle of 90° between devices cannot provide output signals with small angle error and distortion.

JP 2005-024287 A proposes the connection of devices in a pattern in which their longitudinal directions are perpendicular to each other to cancel the AMR effect. Japanese Patent 3587678 proposes a semi-circular or spiral device pattern with reduced $H_k$. However, these structures only cancel the AMR effect or reduce $H_k$, but they do not treat signals to reduce the angle error.

OBJECT OF THE INVENTION

Accordingly, an object of the present invention is to provide an apparatus comprising a magnetic sensor having SVGMR devices for detecting a rotation angle with reduced angle error due to the production unevenness, etc. of the magnetic sensor.

DISCLOSURE OF THE INVENTION

The first rotation-angle-detecting apparatus of the present invention comprises a magnet rotor, a magnetic sensor detecting the direction of magnetic flux from the magnet rotor, a correction circuit, and an angle-calculating circuit, the magnetic sensor having a bridge circuit X comprising four connected magnetoresistive devices and a bridge circuit Y comprising four connected magnetoresistive devices, each of the magnetoresistive devices comprising a spin-valve, giant-magnetoresistive film comprising a pinned layer having a magnetization direction fixed in one direction, a free layer whose magnetization direction is variable to be in alignment with the direction of an external magnetic field, and an intermediate layer sandwiched by the pinned layer and the free layer, the correction circuit calculating difference (Vx−Vy) and sum (Vx+Vy) from the output voltage Vx of the bridge circuit X and the output voltage Vy of the bridge circuit Y, and making their amplitudes equal to each other, and the angle-calculating circuit conducting the arctangent calculation of (Vx−Vy)'/(Vx+Vy)' obtained from a signal (Vx−Vy)' and a signal (Vx+Vy)' supplied with the same amplitude from the correction circuit, to determine the rotation angle of the magnet rotor.

The second rotation-angle-detecting apparatus of the present invention comprises a magnet rotor, a magnetic sensor detecting the direction of magnetic flux from the magnet rotor, operational amplifier circuits, a correction circuit, and an angle-calculating circuit, the magnetic sensor having a bridge circuit X comprising four connected magnetoresistive devices and a bridge circuit Y comprising four connected magnetoresistive devices, each of the magnetoresistive devices comprising a spin-valve, giant-magnetoresistive film comprising a pinned layer having a magnetization direction fixed in one direction, a free layer whose magnetization direction is variable to be in alignment with the direction of an external magnetic field, and an intermediate layer sandwiched by the pinned layer and the free layer, the operational amplifier circuits calculating difference (Vx−Vy) and sum (Vx+Vy) from the output voltage Vx of the bridge circuit X and the output voltage Vy of the bridge circuit Y, the correction circuit making the amplitudes of the signals (Vx−Vy) and (Vx+Vy) supplied from the operational amplifier circuits equal to each other, and the angle-calculating circuit conducting the arctangent calculation of (Vx−Vy)'/(Vx+Vy)' obtained from a signal (Vx−Vy)' and a signal (Vx+Vy)' supplied with the same amplitude from the correction circuit, to determine the rotation angle of the magnet rotor.

At least one longitudinal direction of the magnetoresistive device is preferably inclined to the magnetization directions of pinned layers therein by an acute angle θ meeting the condition of 36°≦θ<45°.

It is preferable that among four magnetoresistive devices in each of the bridge circuit X and the bridge circuit Y, two magnetoresistive devices are inclined to the magnetization directions of pinned layers by an acute angle θ, while the remaining two magnetoresistive devices are inclined by an acute angle −θ. The magnetization directions of pinned layers in two magnetoresistive devices constituting each half bridge in the bridge circuits X and Y are preferably antiparallel.

The longitudinal direction of the magnetoresistive device in the bridge circuit X and the longitudinal direction of the magnetoresistive device in the bridge circuit Y are preferably perpendicular to each other.

By the nonparallel arrangement of magnetoresistive devices having the same magnetization direction of pinned layers, the AMR effect can be canceled to suppress angle error.

The exchange-coupling magnetic field $H_{int}$ between the pinned layer and the free layer in the spin-valve, giant-magnetoresistive film is preferably within ±0.4 kA/m.

DESCRIPTION OF THE BEST MODE OF THE INVENTION

Figure 1:
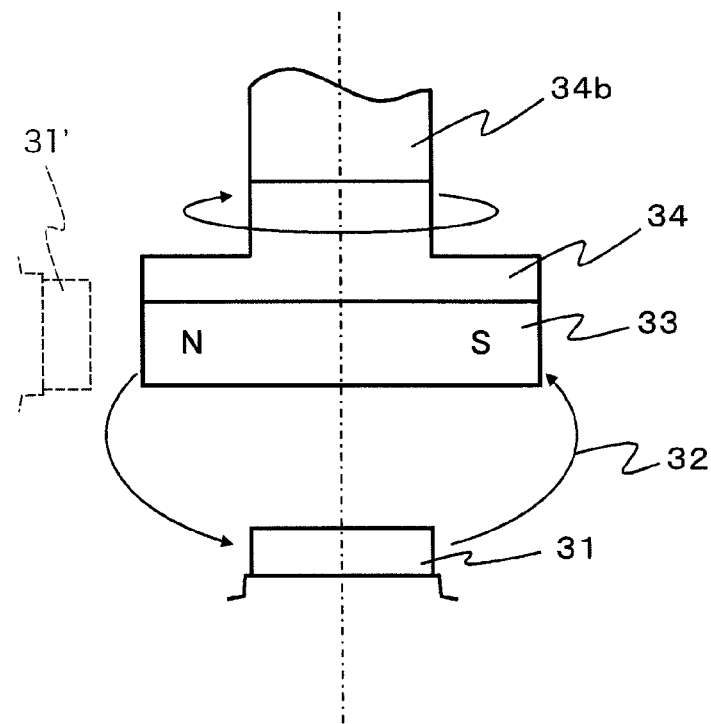
FIG. 1 is a side view schematically showing a rotation-angle-detecting apparatus.

The present invention will be explained below referring to the drawings, though it is not restricted to them.

[1] Rotation-Angle-Detecting Apparatus

FIG. 1 shows one example of rotation-angle-detecting apparatuses. This apparatus comprises a magnetic sensor 31 having bridge-connected SVGMR devices, a disc-shaped permanent magnet 33 magnetized to have two magnetic poles in a diameter direction opposing the magnetic sensor 31, a jig 34 holding the permanent magnet 33, and a rotatable shaft 34b integral with the jig 34, the rotating of the permanent magnet 33 changing a leaked magnetic field. In FIG. 1, a chain line indicates a rotation center axis, the arrows 32 between the permanent magnet 33 and the magnetic sensor 32 indicate magnetic fluxes. The magnetic sensor 31 detects the variation of a magnetic field in a plane direction of the SVGMR device. Another example of the rotation-angle-detecting apparatuses shown in FIG. 1 comprises a magnetic sensor moved from 31 to 31'. A substrate surface of the magnetic sensor 31' is opposite to a peripheral surface of the permanent magnet 33, and has a center axis parallel to the rotation center axis.

[2] Magnetic Sensor

Figure 2:
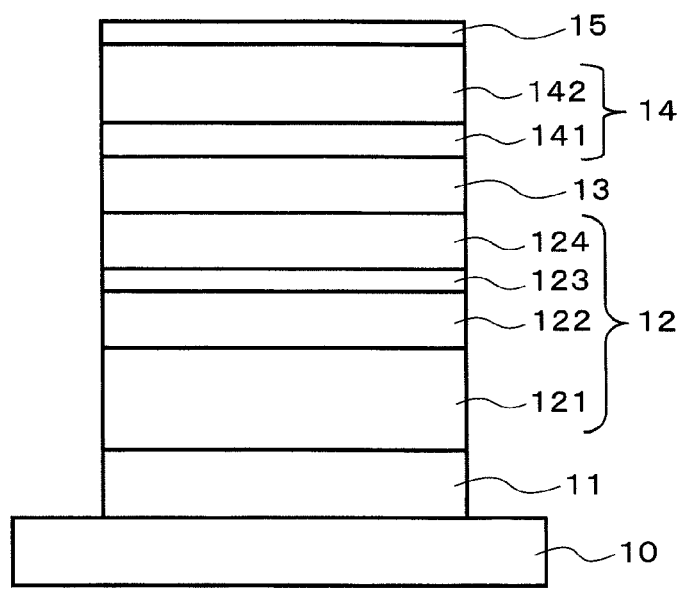
FIG. 2 is a cross-sectional view showing one example of the layer structures of a magnetoresistive film.

FIG. 2 schematically shows one example of the layer structures of SVGMR films, though the magnification of the thickness of each layer is not necessarily constant. The SVGMR film comprises a primer film 11, a pinned layer 12, an intermediate layer 13, a free layer 14, and a protective layer 15 formed in this order on a substrate 10. The pinned layer 12 comprises an antiferromagnetic layer 121, a first ferromagnetic layer 122, an antiparallel-coupling layer 123, and a second ferromagnetic layer 124 in this order from below, and the free layer 14 has two or more ferromagnetic layers 141, 142. The pinned layer 12 has a magnetization direction (unidirectional magnetic anisotropy) fixed in one direction. Electric resistance changes depending on an angle between the magnetization directions of pinned layers and the magnetization direction of a free layer 14 freely rotating by an external magnetic field.

Figure 3:
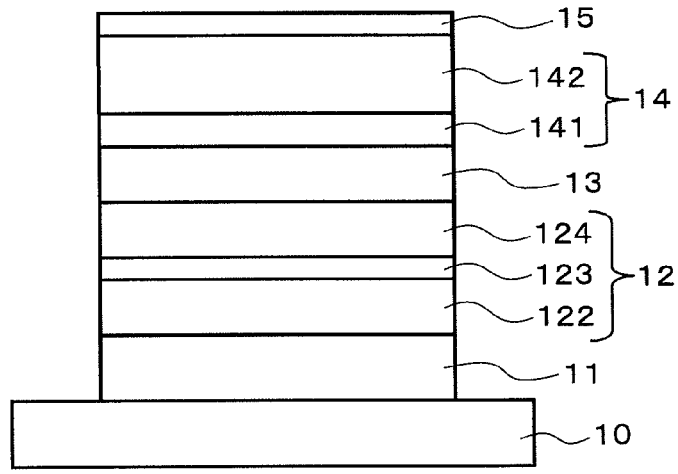
FIG. 3 is a cross-sectional view showing another example of the layer structures of a magnetoresistive film.

FIG. 3 shows another example of the layer structures of SVGMR films. Because this SVGMR film has a layer structure obtained by removing the antiferromagnetic layer 121 from the SVGMR film shown in FIG. 2, the unidirectional magnetic anisotropy of the pinned layer 12 is generated only by the antiferromagnetic coupling of the ferromagnetic layers 122, 124. In the SVGMR film shown in FIG. 3, a heat treatment process for magnetizing the pinned layer by providing the antiferromagnetic layer with a regular structure is not necessary, and the anisotropy of the pinned layer can be set in an arbitrary direction in the film-forming process. Specifically, with a magnetic field applied while forming at least a ferromagnetic layer in contact with the intermediate layer 13 among two ferromagnetic layers for the pinned layer, the magnetization direction of the pinned layer can be aligned with the direction of a magnetic field applied. In the present invention, four SVGMR films with pinned layers having different magnetization directions are laminated via insulating layers, devices with pinned layers having four magnetization directions are formed on the same wafer.

Figure 4:
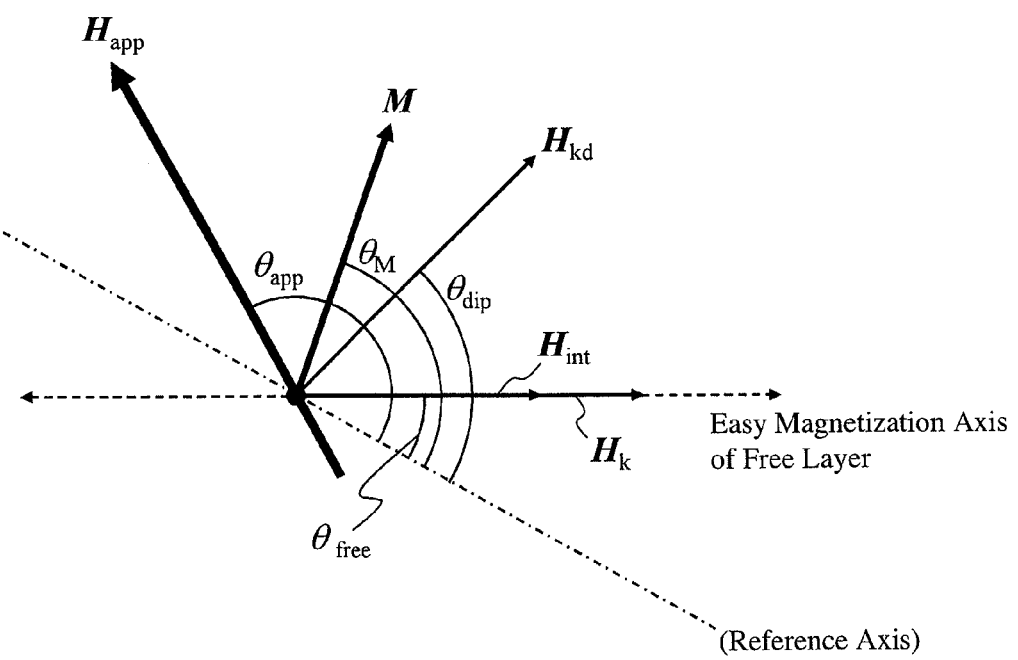
FIG. 4 is a schematic view showing magnetic energy received by a magnetoresistive device.

FIG. 4 schematically shows magnetic energy received by the SVGMR device (magnetoresistive device). $\theta_M$ represents the magnetization direction of the entire device, $\theta_{dip}$ represents a shape-induced anisotropy direction, and $\theta_{free}$ represents the monoaxial magnetic anisotropy direction of a free layer. When an external magnetic field $H_{app}$ is applied to the SVGMR device, an effective magnetic field M added to the device is oriented in a different direction from that of $H_{app}$, under the influence of anisotropy $H_{kd}$ induced by the shape of the device, and magnetic fields such as $H_k$, $H_{int}$, etc. occurring by the SVGMR film.

The SVGMR device is subject to a magnetic energy $E_{total}$ expressed by the following formula (1):

$$E_{total}=E_{kd}+E_k+E_{ex}+E_z \quad (1),$$

wherein $E_{kd}$ represents the shape-induced magnetic anisotropy energy of the SVGMR device, $E_k$ represents the magnetic anisotropy energy of the free layer, $E_{ex}$ represents the interlayer exchange-coupling energy of the SVGMR film, and $E_z$ represents the Zeeman energy of the SVGMR film, respectively expressed by the following formulae (2)-(5):

$$E_{kd}=K_{ud}\sin^2(\theta_M-\theta_{dip}) \quad (2),$$

$$E_k=K_u\sin^2(\theta_M-\theta_{free}) \quad (3),$$

$$E_{ex}=-H_{int}\cdot M_S\cos(\theta_M-\theta_{free}) \quad (4), \text{ and}$$

$$E_z=-H_{app}\cdot M_S\cos(\theta_{app}-\theta_M) \quad (5).$$

$M_S$ represents the magnetization of the free layer, and the magnetic anisotropy constants $K_{ud}$ and $K_u$ are expressed by the following formulae (6) and (7):

$$K_{ud}=(H_{kd}\cdot M_S)/2 \quad (6), \text{ and}$$

$$K_u=(H_k\cdot M_S)/2 \quad (7).$$

The direction $\theta_M$ of M is obtained when the $E_{total}$ is minimum. Using this $\theta_M$, the resistance R of the SVGMR device is expressed by the following formula (8):

$$R = \left\{R_{min} + \frac{dR}{2}(1 - \cos(\theta_M - \theta_{pin}))\right\} + \{dR'\cos^2(\theta_M - \theta_{dip})\}, \quad (8)$$

wherein $R_{min}$ represents the minimum resistance of the SVGMR device, dR represents resistance variation due to the GMR effect, and dR' represents resistance variation due to the AMR effect.

A first term in the formula (8) represents resistance variation due to the GMR effect, and a second term represents resistance variation due to the AMR effect.

Figure 5A:
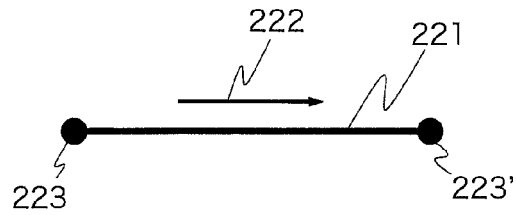
FIG. 5(a) is a schematic view showing a magnetoresistive device formed by a straight line.
Figure 5B:
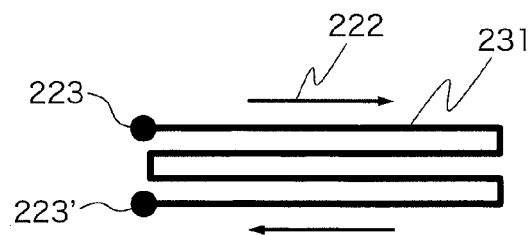
FIG. 5(b) is a schematic view showing a magnetoresistive device formed by a folded line.
Figure 6A:
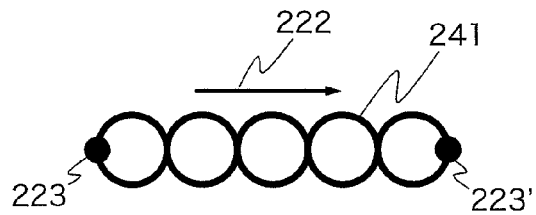
FIG. 6(a) is a schematic view showing one example of magnetoresistive devices formed by connecting pluralities of circles.
Figure 6B:
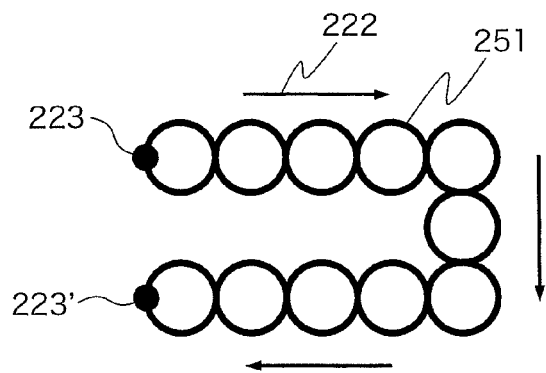
FIG. 6(b) is a schematic view showing another example of magnetoresistive devices formed by connecting pluralities of circles.
Figure 7A:
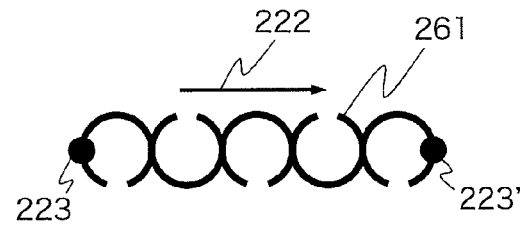
FIG. 7(a) is a schematic view showing one example of magnetoresistive devices formed by connecting pluralities of partially notched circles.
Figure 7B:
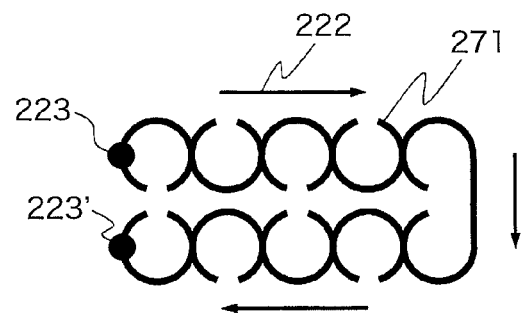
FIG. 7(b) is a schematic view showing another example of magnetoresistive devices formed by connecting pluralities of partially notched circles.
Figure 8A:
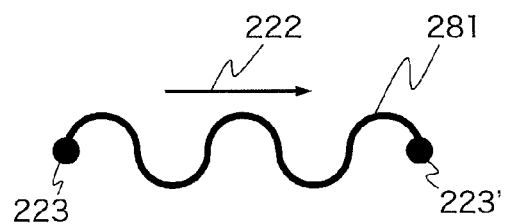
FIG. 8(a) is a schematic view showing one example of magnetoresistive devices formed by connecting pluralities of semi-circles.
Figure 8B:
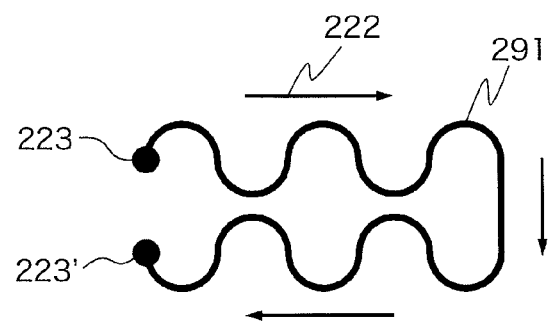
FIG. 8(b) is a schematic view showing another example of magnetoresistive devices formed by connecting pluralities of semi-circles.
Figure 9A:
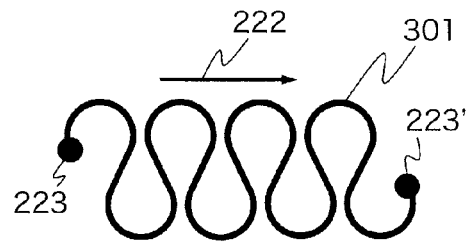
FIG. 9(a) is a schematic view showing a further example of magnetoresistive devices formed by connecting pluralities of semi-circles.
Figure 9B:
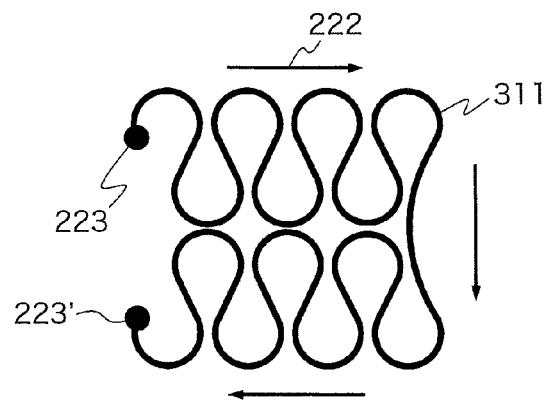
FIG. 9(b) is a schematic view showing a still further example of magnetoresistive devices formed by connecting pluralities of semi-circles.
Figure 10A:
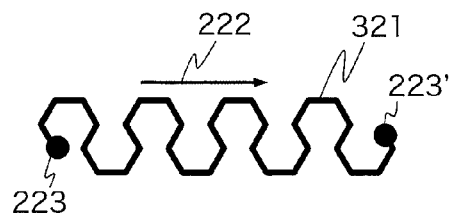
FIG. 10(a) is a schematic view showing one example of magnetoresistive devices formed by connecting pluralities of polygons.
Figure 10B:
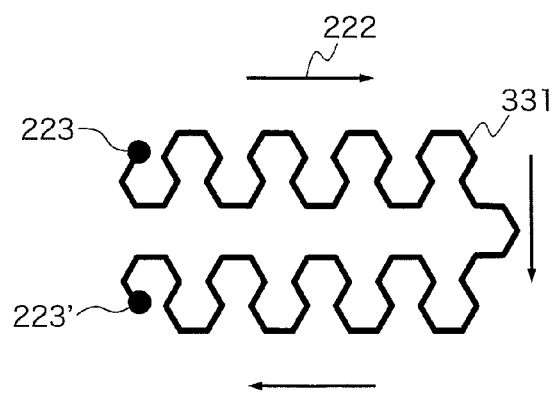
FIG. 10(b) is a schematic view showing another example of magnetoresistive devices formed by connecting pluralities of polygons.

The shape-induced anisotropy direction $\theta_{dip}$, which is determined by the shape of the SVGMR device, is in alignment with the longitudinal direction of the device. For instance, in the case of an SVGMR device 221 formed by a straight line having a rectangular shape with a large aspect ratio as shown in FIG. 5(a) or an SVGMR device 231 formed by a folded straight line as shown in FIG. 5(b), $\theta_{dip}$ is substantially in alignment with the direction 222 of current flowing between terminals 223, 223' (longitudinal direction of the device). In the case of SVGMR devices 241, 251 each formed by connecting pluralities of circles as shown in FIGS. 6(a) and 6(b), $\theta_{dip}$ is in alignment with the direction 222 of current flowing between terminals 223, 223' (longitudinal direction of the device). In the case of SVGMR devices 261, 271, 281, 291, 301, 311, 321, 331 each formed by connecting pluralities of partially notched circles, semi-circles or polygons as shown in FIGS. 7(a) to 10(b), too, $\theta_{dip}$ is in alignment with the direction 222 of current (longitudinal direction of the device).

Figure 11:
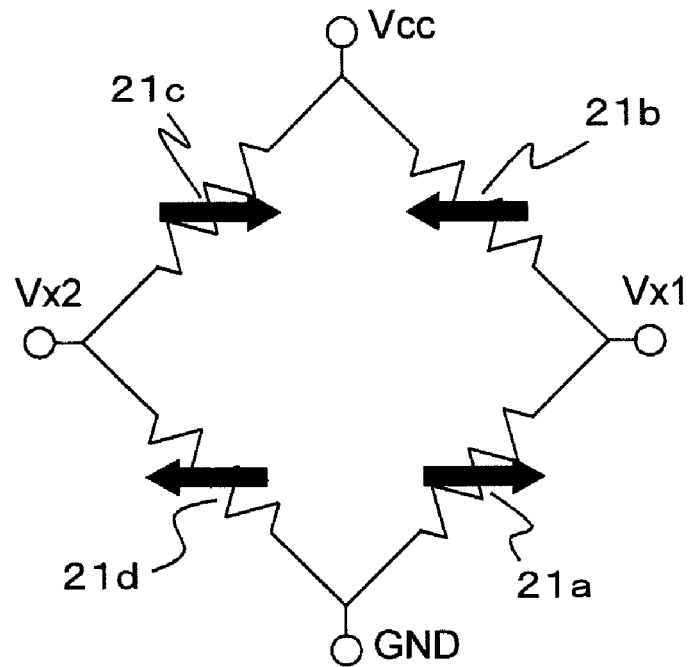
FIG. 11 is a view showing a bridge circuit of magnetoresistive devices constituting the magnetic sensor.
Figure 11:
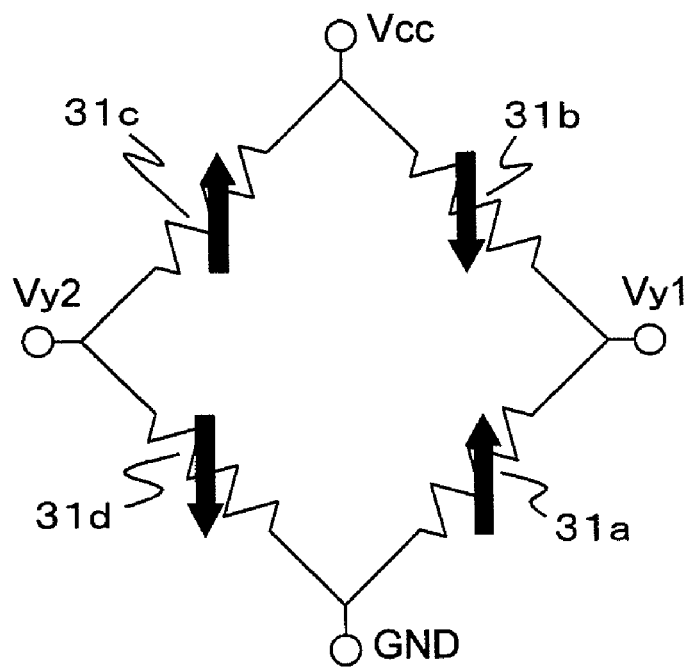

FIG. 11 shows the equivalent circuit of a magnetic sensor in which SVGMR devices are bridge-connected. The magnetization directions of pinned layers in each device are shown by arrows in the figure. Pinned layers have the same magnetization direction between devices 21a and 21c, between devices 21b and 21d, between devices 31a and 31c, and between devices 31b and 31d. Pinned layers have antiparallel magnetization directions (180° opposite directions) between the devices 21a and 21b, and between the devices 31a and 31b, and pinned layers have perpendicular magnetization directions between the devices 21a and 31a. The devices 21a-21d constitute a bridge X, and the devices 31a-31d constitute a bridge Y. In an actual bridge circuit, perpendicular arrangement is made between the devices 21a and 31a, between the devices 21b and 31b, between the devices 21c and 31c, and between the devices 21d and 31d. Unless otherwise mentioned, an angle between a device and the magnetization directions of pinned layers means an angle between a longitudinal direction of the device and the magnetization directions of pinned layers. Voltages Vx1, Vx2, Vy1, Vy2 output from the bridge circuits are expressed by the following formulae (9)-(12):

$$V_{x1} = \left(\frac{R_{21a}}{R_{21a} + R_{21b}}\right) \times V_{cc}, \quad (9)$$

$$V_{x2} = \left(\frac{R_{21d}}{R_{21c} + R_{21d}}\right) \times V_{cc}, \quad (10)$$

$$V_{y1} = \left(\frac{R_{31a}}{R_{31a} + R_{31b}}\right) \times V_{cc}, \text{ and} \quad (11)$$

$$V_{y2} = \left(\frac{R_{31d}}{R_{31c} + R_{31d}}\right) \times V_{cc}, \quad (12)$$

wherein each of $R_{21a}$-$R_{21d}$ and $R_{31a}$-$R_{31d}$ represents the resistance of each device 21a-21d, 31a-31d.

The output voltage $V_x$ is obtained from $V_{x1}$-$V_{x2}$, and the output voltage $V_y$ is obtained from $V_{y1}$-$V_{y2}$. $V_x$ and $V_y$ have a substantially sine or cosine waveform. The difference between an angle $\theta_{calc}$ obtained from $V_x$ and $V_y$ by arctangent calculation and the angle $\theta_{app}$ of $H_{app}$ relative to the reference axis is an angle error $\theta_{err}$ of the magnetic sensor.

[3] Signal-Treating Circuit

A signal-treating circuit used in the rotation-angle-detecting apparatus of the present invention is (a) a first signal-treating circuit comprising a correction circuit and an angle-calculating circuit, or (b) a second signal-treating circuit comprising operational amplifier circuits, a correction circuit and an angle-calculating circuit.

(1) Principle

Figure 12:
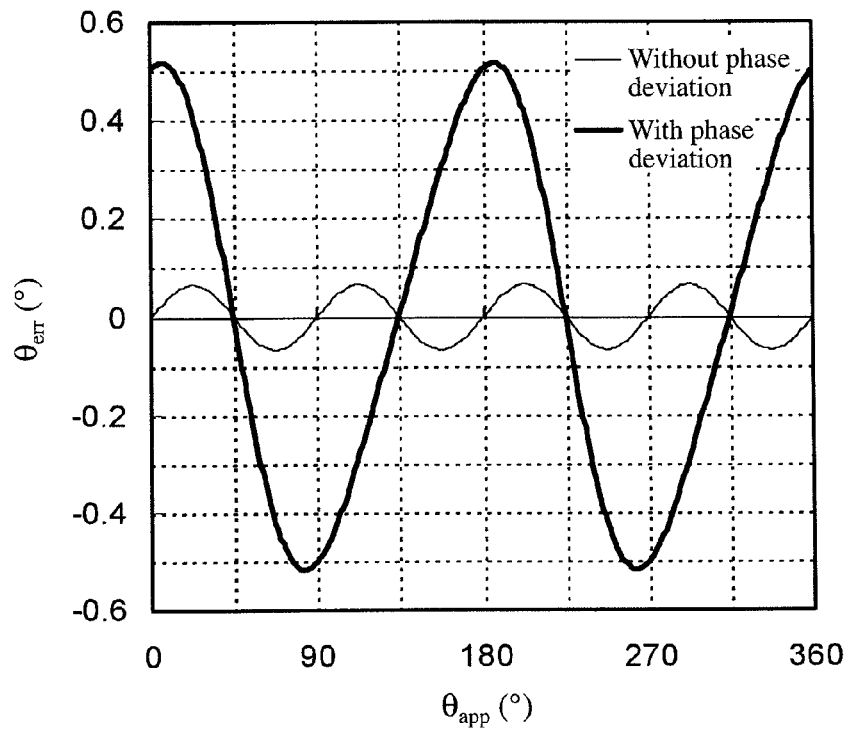
FIG. 12 is a graph showing the relation between $\theta_{err}$ and $\theta_{app}$ when the phase deviation is 0° and 1°.

Both of the first and second signal-treating circuits can reduce angle error due to the production unevenness, etc. of the magnetic sensor. For example, phase difference between the output Vx of a bridge circuit X and the output Vy of a bridge circuit Y is not π/2, but may be π/2±Δ due to production unevenness, etc. FIG. 12 shows the relation between angle error $\theta_{err}$ and $\theta_{app}$ (angle of $H_{app}$ to a reference axis) when Δ is 0° and 1°, respectively, in the phase difference of π/2±Δ in the bridge circuits X and Y of Sample 3-4. FIG. 12 shows that the angle error increases with Δ.

In such case, the following correction can remove the influence of Δ. The output Vx of the bridge circuit X and the output Vy of the bridge circuit Y are expressed by the formulae (13) and (14):

$$V_x = \cos\theta_{app} \quad (13), \text{ and}$$

$$V_y = \cos(\theta_{app} - \pi/2 + \Delta) \quad (14).$$

(Vx-Vy) and (Vx+Vy) are two signals with phase difference of π/2 as shown by the formulae (15) and (16):

$$Vx - Vy = 2\sin(\pi/4 - \Delta/2)\sin(\theta_{app} - \pi/4 + \Delta/2) \quad (15), \text{ and}$$

$$Vx + Vy = 2\cos(\pi/4 - \Delta/2)\cos(\theta_{app} - \pi/4 + \Delta/2) \quad (16).$$

With the amplitudes of the signal (Vx-Vy) and the signal (Vx+Vy) made equal (normalized), a signal (Vx-Vy)' and a signal (Vx+Vy)' are generated to calculate their ratio (Vx-Vy)'/(Vx+Vy)'. Because (Vx-Vy)'/(Vx+Vy)'=sin($\theta_{app}$-π/4+Δ/2)/cos($\theta_{app}$-π/4+Δ/2), the angle θ is expressed by the following formula (17):

$$\theta = \tan^{-1}\left(\frac{\sin\left(\theta_{app} - \frac{\pi}{4} + \frac{\Delta}{2}\right)}{\cos\left(\theta_{app} - \frac{\pi}{4} + \frac{\Delta}{2}\right)}\right) = \theta_{app} - \frac{\pi}{4} + \frac{\Delta}{2}. \quad (17)$$

Figure 13:
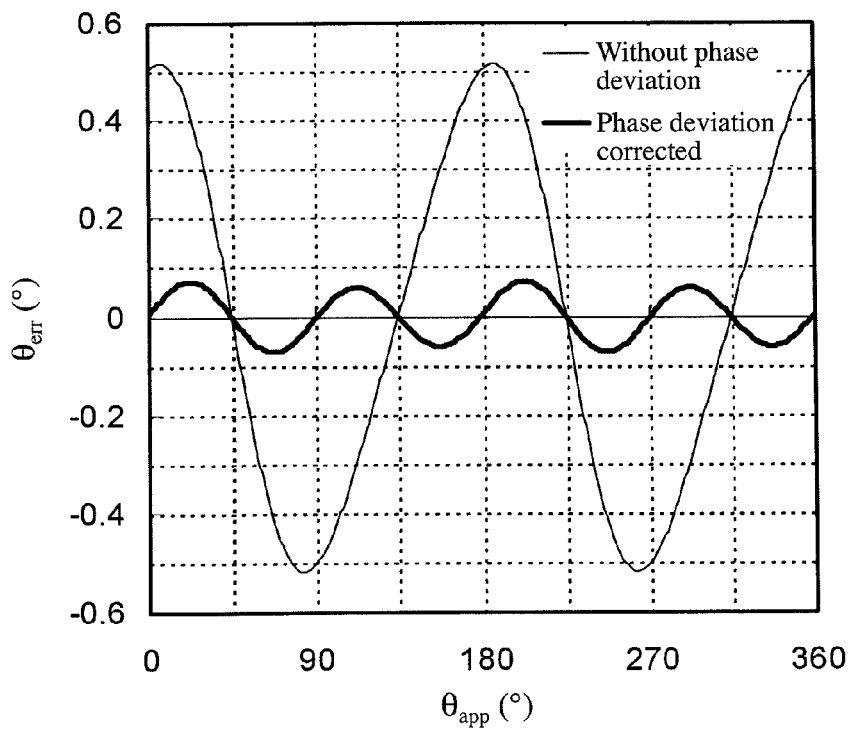
FIG. 13 is a graph showing the relation between $\theta_{err}$ and $\theta_{app}$ when the phase deviation is 1°, and when the phase deviation is corrected.

The formula (17) indicates that $\theta_{app}$ can be detected without error despite a different initial phase. FIG. 13 shows the relation between the angle error $\theta_{err}$ and $\theta_{app}$ when the phase deviation is corrected. The corrected angle error $\theta_{err}$ returns to a waveform of $\theta_{err}$ of Sample 3-4 shown in FIG. 12, making it possible to cancel the phase deviation completely.

(2) The First Signal-Treating Circuit

Figure 14:
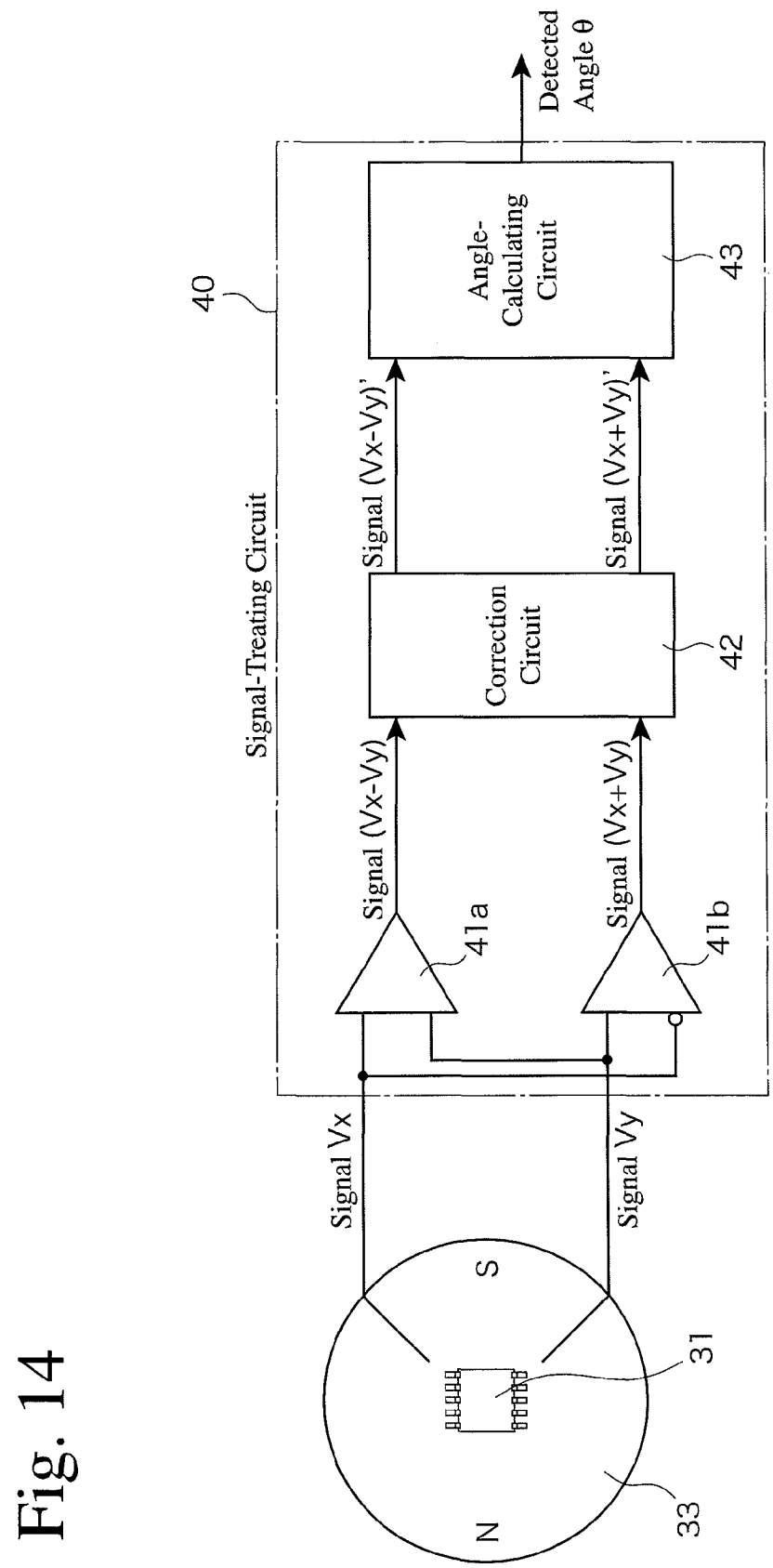
FIG. 14 is a schematic view showing one example of the rotation-angle-detecting apparatuses of the present invention.

FIG. 14 shows a first signal-treating circuit 40 for canceling a phase deviation. The rotation-angle-detecting apparatus comprises a rotor comprising a two-pole magnet 33 fixed to a shaft, and a magnetic sensor 31 arranged near the two-pole magnet 33. The signal-treating circuit 40 comprises operational amplifiers 41a, 41b receiving output voltages Vx, Vy from the bridge circuits X, Y in the magnetic sensor 31, an A-D converting correction circuit 42 receiving outputs from the operational amplifiers 41a, 41b, and an angle-calculating circuit 43 receiving outputs from the A-D converting correction circuit 42. The operational amplifier 41a calculates (Vx−Vy) from the output voltages Vx, Vy, and the operational amplifier 41b calculates (Vx+Vy) from the output voltages Vx, Vy. The A-D converting correction circuit 42 conducts analog-digital conversion of the signals (Vx−Vy) and (Vx+Vy) input from the operational amplifiers 41a, 41b, and makes correction such that their amplitudes become the same, thereby outputting signals (Vx−Vy)' and (Vx+Vy)' with the same amplitude. The angle-calculating circuit 43 receives the signals (Vx−Vy)' and (Vx+Vy)' from the correction circuit 42 to conduct the arctangent calculation of (Vx−Vy)'/(Vx+Vy)' to determine an angle θ.

To provide the signals (Vx−Vy) and (Vx+Vy) with the same amplitude by the correction circuit 42, an amplitude is corrected for both or one of the signals (Vx−Vy) and (Vx+Vy). In the former case, for example, the amplitudes of the signals (Vx−Vy) and (Vx+Vy) input to the correction circuit 42 are multiplied by $C_1$ and $C_2$, respectively, to generate a signal $C_1$(Vx−Vy) and a signal $C_2$(Vx+Vy) having the same amplitude. In this case, (Vx−Vy)'=$C_1$(Vx−Vy), and (Vx+Vy)'=$C_2$(Vx+Vy). In the latter case, for example, the amplitude of the signal (Vx−Vy) input to the correction circuit 42 is multiplied by $C_3$, to generate a signal $C_3$(Vx−Vy) having the same amplitude with that of the signal (Vx+Vy). In this case, (Vx−Vy)'=$C_3$(Vx−Vy), and (Vx+Vy)'=(Vx+Vy).

(3) Second Signal-Treating Circuit

Figure 15:
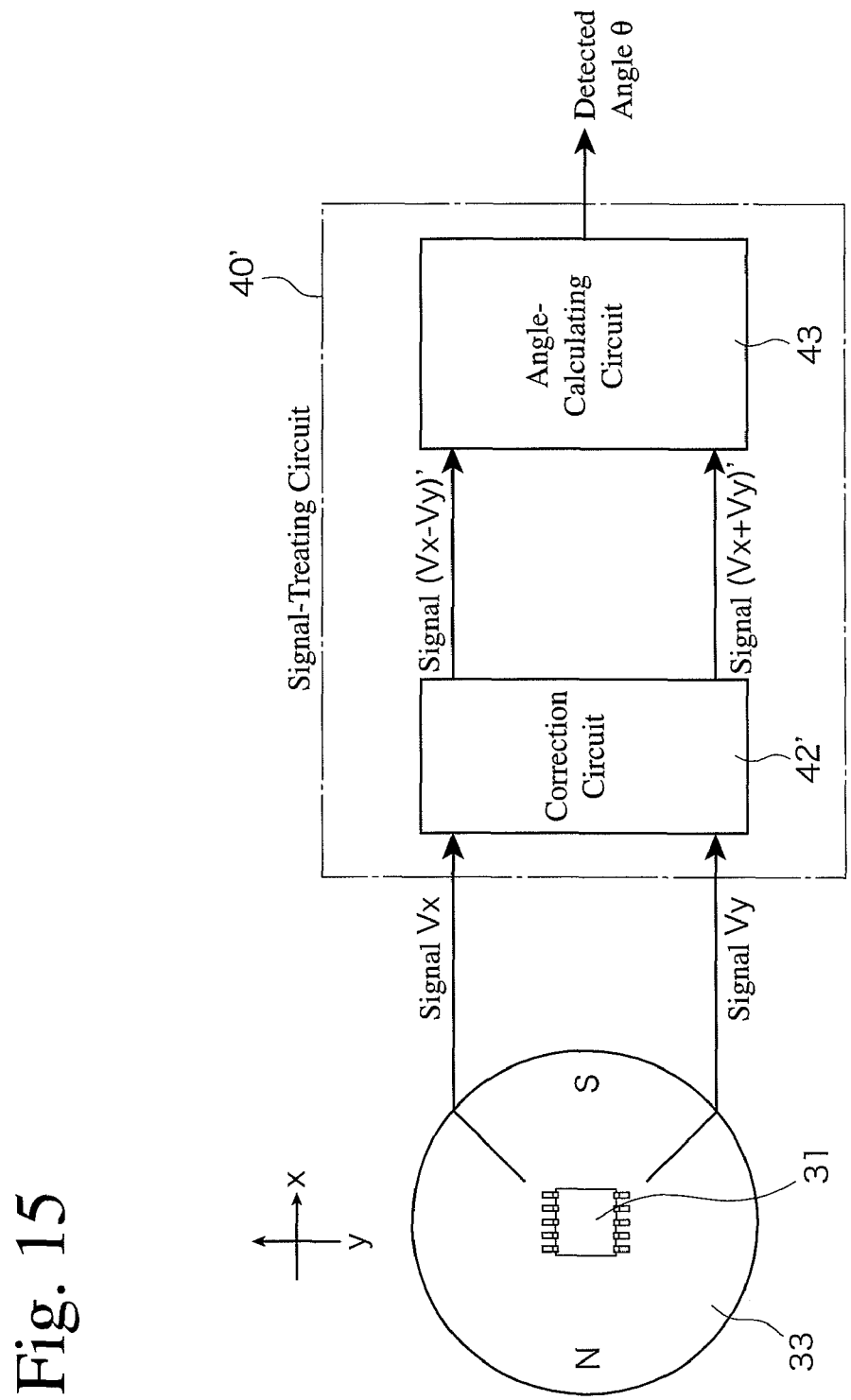
FIG. 15 is a schematic view showing another example of the rotation-angle-detecting apparatuses of the present invention.

FIG. 15 shows a second signal-treating circuit 40' for canceling a phase deviation. The rotation-angle-detecting apparatus per se is the same as shown in FIG. 14. The signal-treating circuit 40' comprises an A-D converting correction circuit 42' receiving the output voltages Vx, Vy from the bridge circuits X, Y in the magnetic sensor 31, conducting analog-digital conversion to them, calculating (Vx−Vy) and (Vx+Vy) and making their amplitude corrections, and an angle-calculating circuit 43 receiving the outputs (Vx−Vy)', (Vx+Vy)' from the A-D converting correction circuit 42' to conduct the arctangent calculation of (Vx−Vy)'/(Vx+Vy)' to determine an angle θ. In the second signal-treating circuit 40', the functions of the operational amplifiers 41a, 41b in the first signal-treating circuit 40, and the A-D converting correction circuit are carried out by the A-D converting correction circuit 42'.

[4] Preferred Examples of Magnetic Sensor

Example 1

Figure 16:
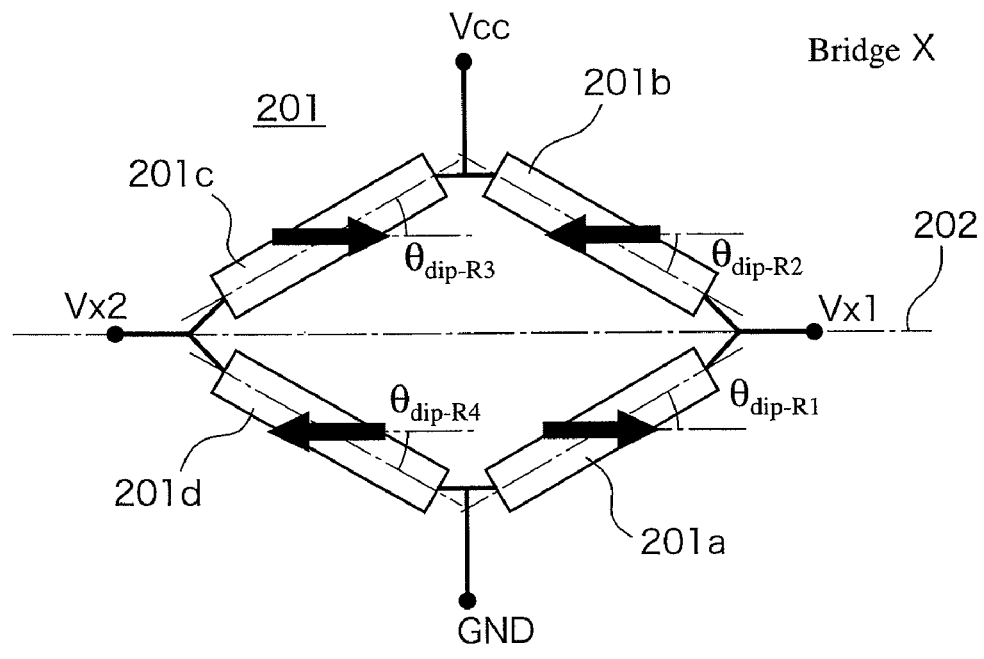
FIG. 16 is a schematic view showing one example of the arrangements of magnetoresistive devices in each bridge circuit.
Figure 16:
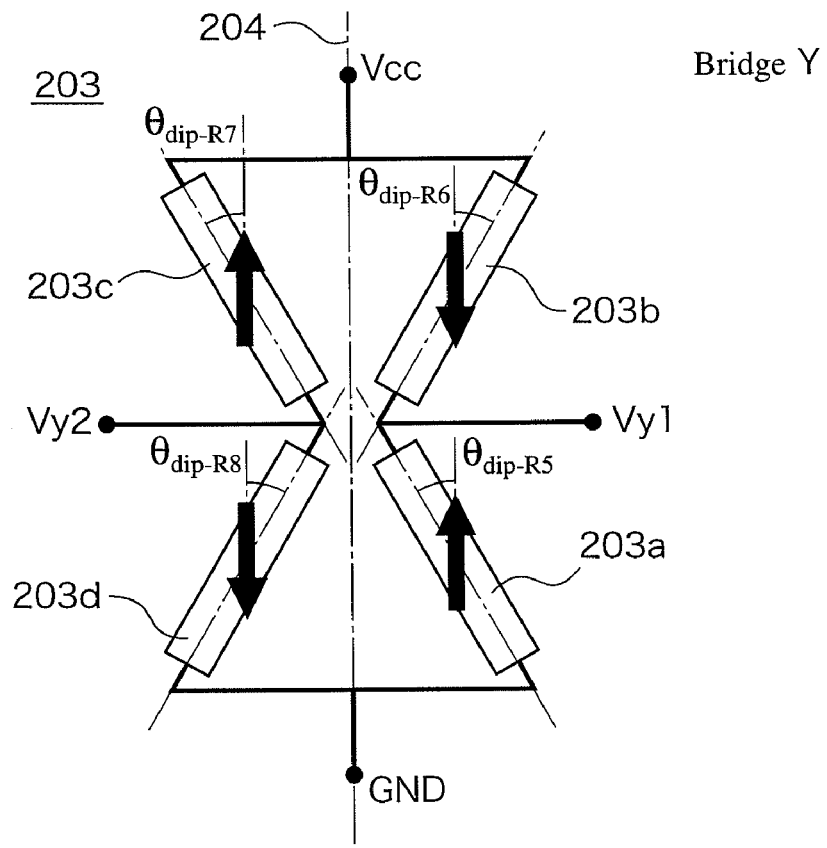

FIG. 16 shows one example of magnetic sensors having bridge circuits X and Y comprising SVGMR devices. The depicted device arrangement corresponds to that of Sample 1-3 in Table 1 explained later. In the bridge circuit X, four rectangular SVGMR devices 201a-201d are formed on a substrate, the devices 201b and 201c being connected to a power supply terminal Vcc, the devices 201a and 201d being connected to a ground terminal GND, the devices 201a and 201b being connected to one output terminal $Vx_1$, and the devices 201c and 201d being connected to the other output terminal $Vx_2$. The longitudinal directions of the devices 201a-201d are inclined by angles $\theta_{dip-R1}$ to $\theta_{dip-R4}$ to an axis 202 parallel to the magnetization directions of pinned layers shown by the arrows. In the bridge circuit Y, four rectangular SVGMR devices 203a-203d formed on a substrate are perpendicular to the corresponding devices 201a-201d in the bridge circuit X. Each device comprises pinned layers having magnetization directions parallel to an axis 204 perpendicular to the axis 202, with its longitudinal direction inclined by an angle $\theta_{dip-R5}$ to $\theta_{dip-R8}$ to the axis 204. In the magnetic sensor shown in FIG. 16, the devices having pinned layers with the same magnetization direction have parallel longitudinal directions. $\theta_{dip-R1}$ to $\theta_{dip-R4}$ and $\theta_{dip-R5}$ to $\theta_{dip-R8}$ of the devices 201a-201d, 203a-203d meet the following relations:

$\theta_{dip-R1}$ of device 201a=$\theta_{dip-R3}$ of device 201c, $\theta_{dip-R2}$ of device 201b=$\theta_{dip-R4}$ of device 201d, $\theta_{dip-R1}=-\theta_{dip-R2}$, $\theta_{dip-R5}$ of device 203a=$\theta_{dip-R7}$ of device 203c, $\theta_{dip-R6}$ of device 203b=$\theta_{dip-R8}$ of device 203d, and $\theta_{dip-R5}=-\theta_{dip-R6}$.

Figure 17:
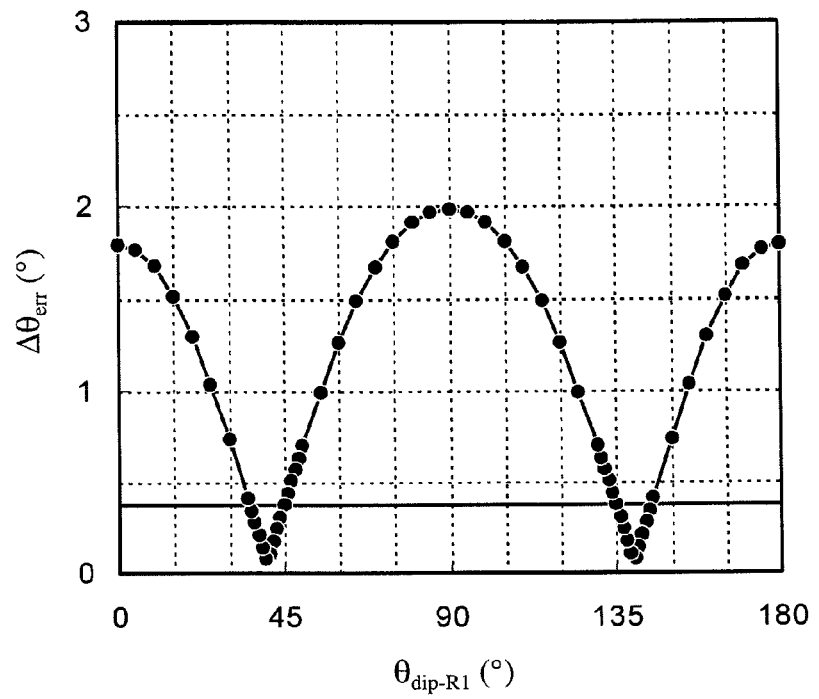
FIG. 17 is a graph showing the relation between the shape-induced anisotropy direction $\theta_{dip}$ and $\Delta\theta_{err}$ (variation range of the angle error $\theta_{err}$) in the magnetoresistive device.

With the right direction of the bridge circuit X being 0°, and with the upper direction of the bridge circuit Y being 0°, $\theta_{dip}$ of each device 201a-201d, 203a-203d was changed as shown in Table 1, in which the angle of the device in a counterclockwise direction is expressed with "+," and the value in parentheses is $\theta_{dip}-180°$, to find the influence of the arrangement angle $\theta_{dip}$ on the variation range ($\Delta\theta_{err}$) of the angle error $\theta_{err}$ by simulation. $\Delta\theta_{err}$ is obtained by subtracting the minimum value of $\theta_{err}$ from the maximum value of $\theta_{err}$ when $\theta_{app}$ changed from 0° to 360°. In this simulation, Ms=800 emu/cc, $H_k$=0.16 kA/m, $H_{kd}$=1.6 kA/m, $H_{app}$=24 kA/m, an angle between $\theta_{free}$ and the magnetization directions of pinned layers in each device=90°, dR/R expressing the GMR ratio=10%, dR'=0, and the AMR effect was not taken into consideration. The results are shown in Table 2 and FIG. 17. $\theta_{dip-R1}$ shown in FIG. 17 corresponds to the arrangement angle $\theta_{dip}$ of the device 201a shown in Table 1. Larger $\Delta\theta_{err}$ provides the magnetic sensor with larger angle error.

TABLE 1

| Sample | Arrangement Angle $\theta_{dip}$ (°) of Each Device | | | |
|---|---|---|---|---|
| | $\theta_{dip-R1}$, $\theta_{dip-R3}$ (201a, 201c) | $\theta_{dip-R2}$, $\theta_{dip-R4}$ (201b, 201d) | $\theta_{dip-R5}$, $\theta_{dip-R7}$ (203a, 203c) | $\theta_{dip-R6}$, $\theta_{dip-R8}$ (203b, 203d) |
| 1-1 | 0 | +180 (0) | 0 | +180 (0) |
| 1-2 | +5 | +175 (−5) | +5 | +175 (−5) |
| 1-3 | +30 | +150 (−30) | +30 | +150 (−30) |
| 1-4 | +40 | +140 (−40) | +40 | +140 (−40) |
| 1-5 | +45 | +135 (−45) | +45 | +135 (−45) |
| 1-6 | +85 | +95 (−85) | +85 | +95 (−85) |
| 1-7 | +90 | +90 (−90) | +90 | +90 (−90) |
| 1-8 | +95 (−85) | +85 (−95) | +95 (−85) | +85 (−95) |
| 1-9 | +140 (−40) | +40 (−140) | +140 (−40) | +40 (−140) |
| 1-10 | +175 (−5) | +5 (−175) | +175 (−5) | +5 (−175) |
| 1-11 | +180 (0) | 0 (−180) | +180 (0) | 0 (−180) |

Table 2 shows $\Delta\theta_{err}$ when the arrangement angle $\theta_{dip-R1}$ of the device 201a shown in Table 1 was 35° to 45°. When the arrangement angle $\theta_{dip-R1}$ of the device 201a was +40° and +140° (−40°) (Samples 1-4 and 1-9), $\Delta\theta_{err}$ was 0.0762°, minimum. When the arrangement angle $\theta_{dip-R1}$ of the device 201a was +140° (−40°), too, the arrangement angle $\theta_{dip-R2}$ of the device 201b constituting a half bridge with the device 201a was −140° (+40°).

TABLE 2

| $\theta_{dip-R1}$ | $\Delta\theta_{err}$ (°) |
|---|---|
| 35 | 0.4101 |
| 36 | 0.3438 |
| 37 | 0.2771 |
| 38 | 0.2102 |
| 39 | 0.1432 |
| 40 | 0.0762 |
| 41 | 0.1088 |
| 42 | 0.1763 |
| 43 | 0.2433 |

TABLE 2-continued

| $\theta_{dip-R1}$ | $\Delta\theta_{err}$ (°) |
|---|---|
| 44 | 0.3099 |
| 45 | 0.3760 |

In Sample 1-1, $\Delta\theta_{err}$ was about 1.8°. Thus, $\theta_{err}$ largely depends on $\theta_{dip}$, meaning that the angle error drastically changes depending on the device arrangement. It is clear from FIG. 17 and Table 2 that small angle error, and thus a magnetic sensor with small output distortion can be obtained by having the device arrangement angle $\theta_{dip}$ meet the condition of $36°\leq\theta_{dip-R1}<45°$. $\theta_{dip}$ is preferably 37-43°, more preferably 39-42°.

A magnetic sensor using a bridge circuit having a device arrangement angle $\theta_{dip}$ of 45° suffers increased angle error (error of a rotation angle obtained from a magnetic sensor output), due to the unevenness of the magnetic properties (interlayer-coupling magnetic field $H_{int}$ and anisotropic magnetic field $H_k$) of the SVGMR devices per se. On the other hand, meeting the condition of $36°\leq\theta_{dip-R1}<45°$ reduces angle error in the magnetic sensor output.

Figure 18:
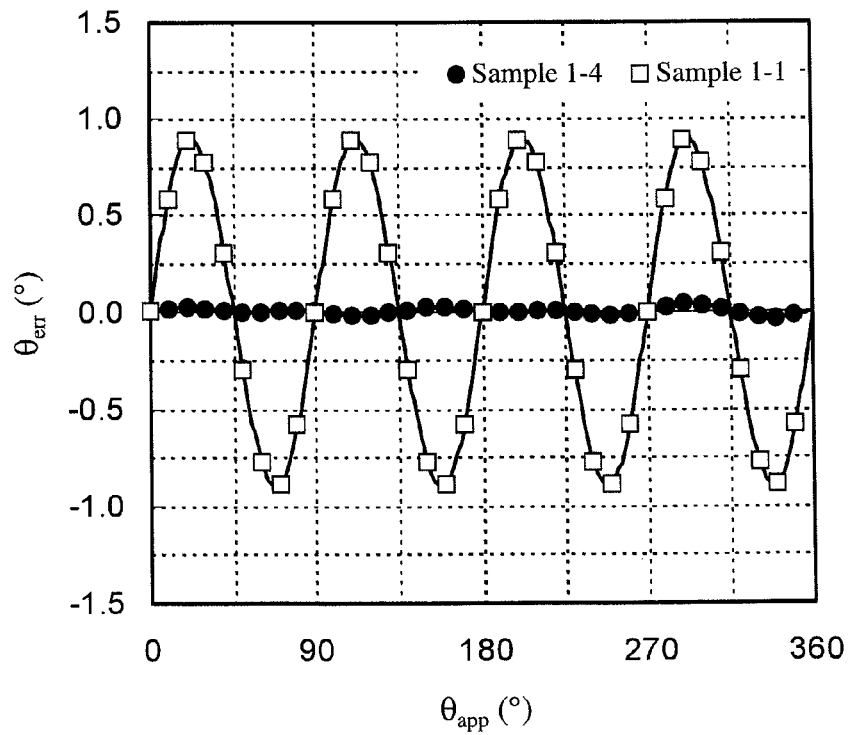
FIG. 18 is a graph showing the relation between the angle $\theta_{app}$ of an external magnetic field $H_{app}$ relative to a reference axis and the angle error $\theta_{err}$ in the magnetoresistive devices of Samples 1-1 and 1-4.
Figure 19:
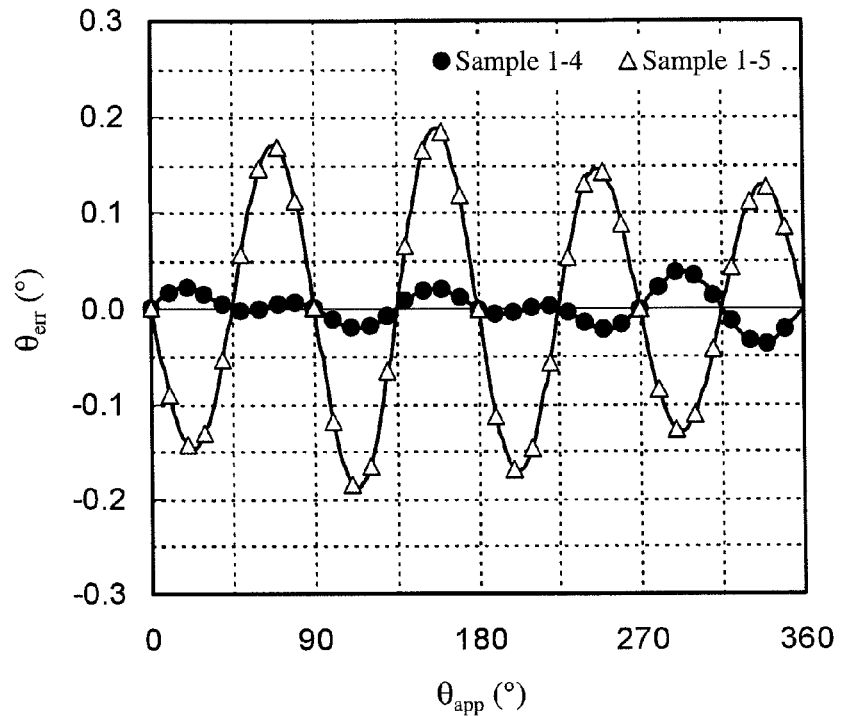
FIG. 19 is a graph showing the relation between $\theta_{app}$ and $\theta_{err}$ in the magnetoresistive devices of Samples 1-4 and 1-5.
Figure 20:
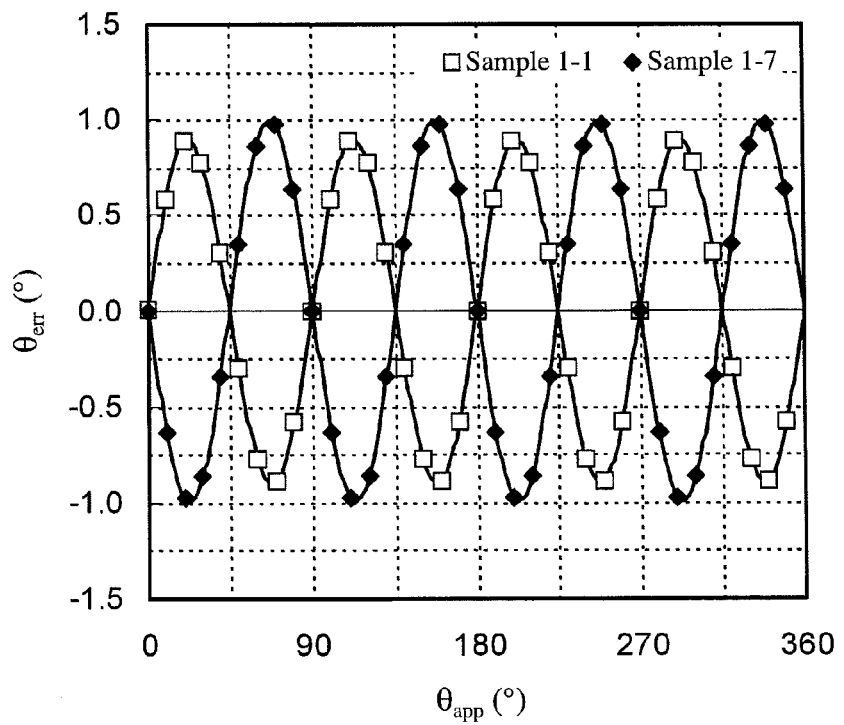
FIG. 20 is a graph showing the relation between $\theta_{app}$ and $\theta_{err}$ in the magnetoresistive devices of Samples 1-1 and 1-7.

The dependence $\theta_{err}$ on $\theta_{app}$ was determined by simulation on Samples 1-1,1-4, 1-5 and 1-7. The results are shown in FIGS. 18-20. Sample 1-5 corresponds to the device arrangement described in JP 2003-502876 A and JP 2005-024287 A. $\theta_{err}$ was about 0.04° at maximum in Sample 1-4, while it was about 0.9° to 1.0° at maximum in Samples 1-1 and 1-7, and about 0.19° in Sample 1-5. Samples 1-4 and 1-5 had largely different $\theta_{err}$, though the difference of $\theta_{dip}$ was 5°. Samples 1-1 and 1-7 had different dependence of $\theta_{err}$ on $\theta_{app}$ despite similar device arrangements, because they had different relations between $\theta_{dip}$ and the magnetization directions of pinned layers. These results indicate that $\theta_{err}$ largely changes depending on the relation between $\theta_{dip}$ and the magnetization directions of pinned layers.

Figure 21:
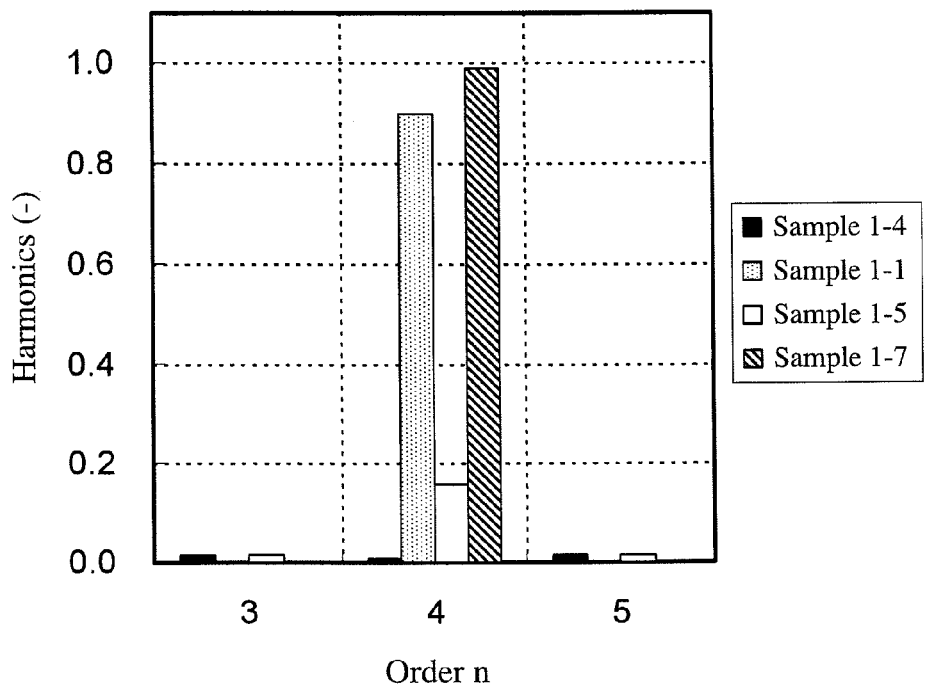
FIG. 21 is a graph showing harmonic components in the magnetoresistive devices of Samples 1-1, 1-4, 1-5 and 1-7.
Figure 22:
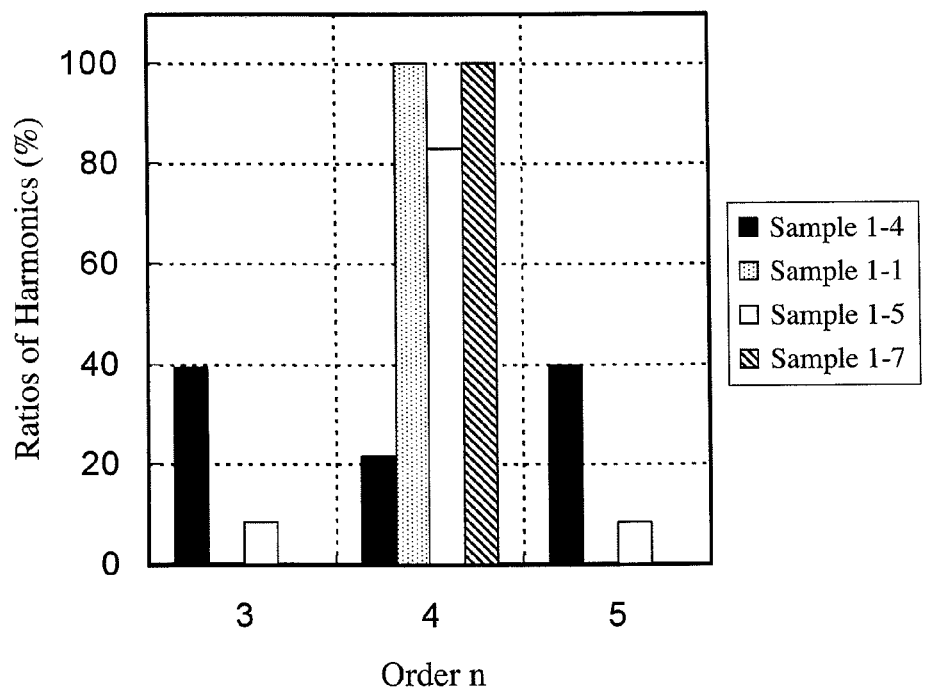
FIG. 22 is a graph showing the ratios of harmonics generated in the magnetoresistive devices of Samples 1-1, 1-4, 1-5 and 1-7.

To further investigate this tendency, $\theta_{err}$ in Samples 1-1,1-4, 1-5 and 1-7 was analyzed by Fourier series expansion to determine up to fifth harmonics. Because first and second harmonics are extremely smaller than higher-order harmonics, with small dependence on $\theta_{dip}$, only third to fifth harmonics are shown in FIGS. 21 and 22. In Sample 1-4 with small $\theta_{err}$, all harmonics are extremely small, the ratios of third and fifth harmonics were both about 40%, and the ratio of fourth harmonic was about 20%. On the other hand, Samples 1-1, 1-5 and 1-7 with large 0, had large fourth harmonic, the ratio of fourth harmonic being about 80%, and the ratios of third and fifth harmonics being both about 10%. Particularly when $\theta_{dip}$ was perpendicular or parallel to the magnetization directions of pinned layers as in Samples 1-1 and 1-7, the fourth harmonic was extremely large. Accordingly, the reduction of fourth harmonic largely contributes to the reduction of $\theta_{err}$.

Figure 23:
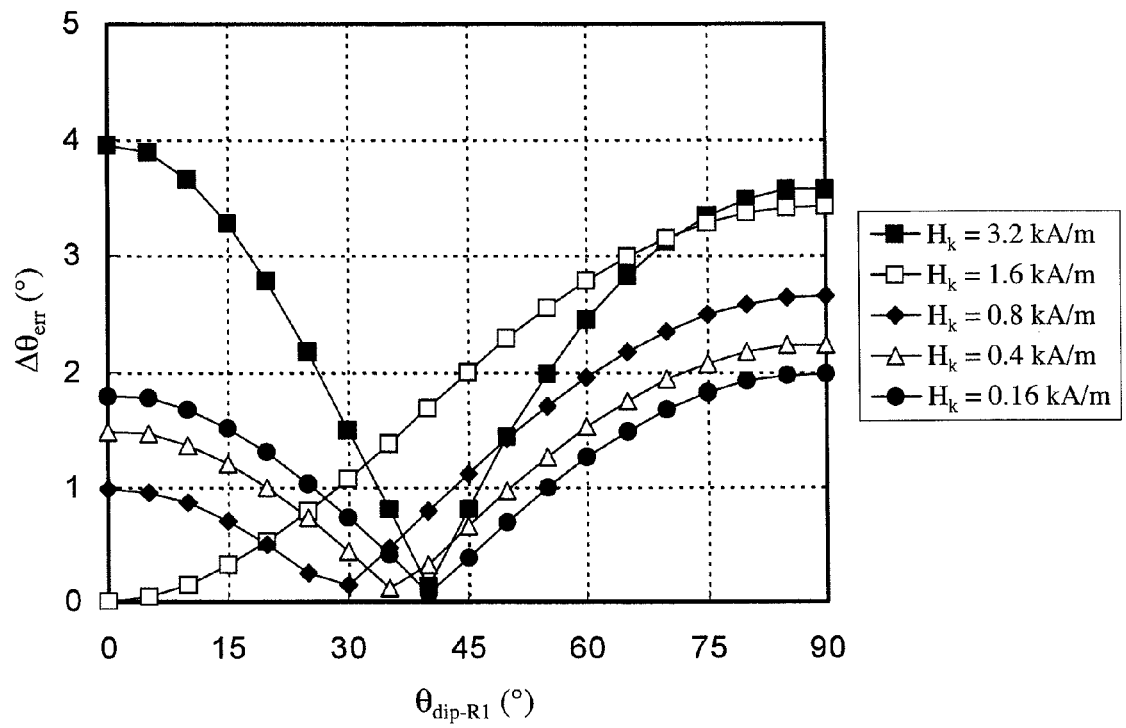
FIG. 23 is a graph showing the relation between $\Delta\theta_{err}$ and $\theta_{dip}$ of a magnetoresistive device in each anisotropic magnetic field $H_k$ when the magnetoresistive device has a fixed shape-induced anisotropy $H_{kd}$.

Because the formulae (2) and (3) have the term of $\sin^2\theta$ in a magnetic sensor using a SVGMR film, it is considered that main causes of generating fourth harmonic are the shapes of devices and the magnetic anisotropy of free layers, namely $H_{kd}$ and $H_k$. When the magnetic anisotropy $H_k$ of a free layer changed from 0.16 kA/m to 3.2 kA/m with $H_{kd}$ fixed to 1.6 kA/m, the dependence of $\Delta\theta_{err}$ on $\theta_{dip}$ was determined by simulation. The results are shown in FIG. 23. decrease in $H_k$ resulted in decrease in the dependence of $\Delta\theta_{err}$ on $\theta_{dip}$. The minimum $\Delta\theta_{err}$ was substantially the same (about 0.07-0.3°) irrespective of $H_k$, and $\theta_{dip}$ providing the minimum $\Delta\theta_{err}$ was substantially in a range of 30-40°. Under the condition that $H_k$ was equal to $H_{kd}$ (=1.6 kA/m), $H_k$ and $H_{kd}$ cancelled each other, providing the minimum $\Delta\theta_{err}$ at $\theta_{dip}=0°$.

Figure 24:
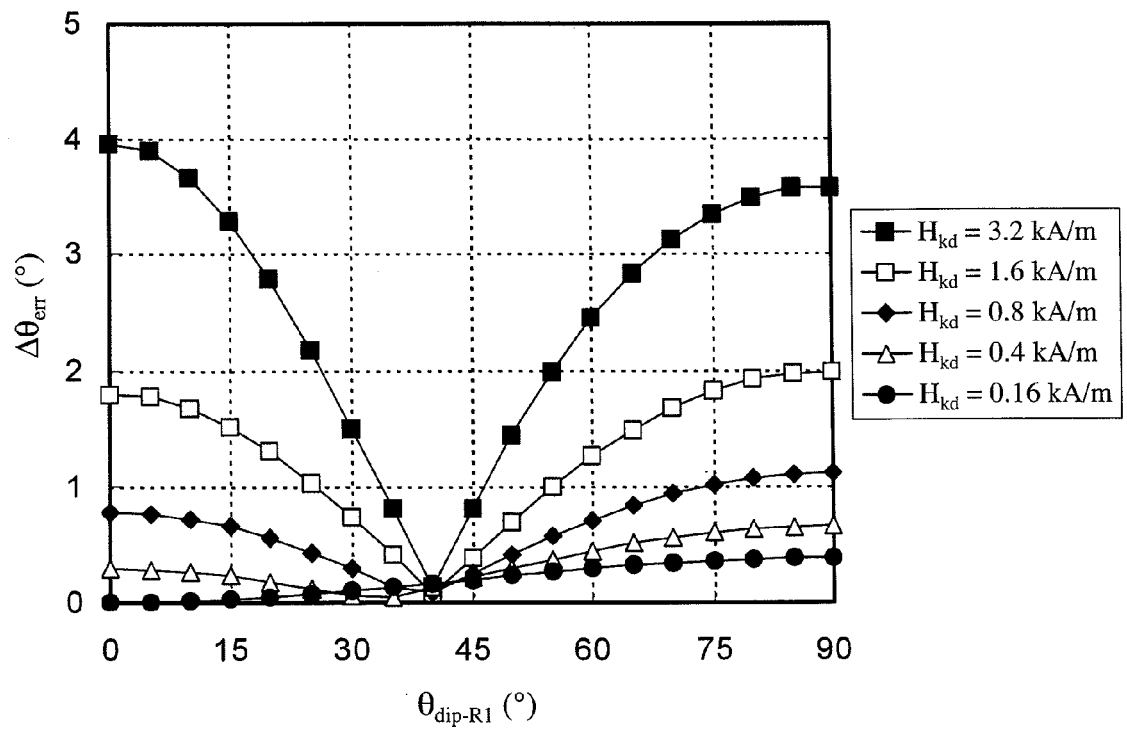
FIG. 24 is a graph showing the relation between $\Delta\theta_{err}$ and $\theta_{dip}$ of a magnetoresistive device in each $H_{kd}$ when $H_k$ is fixed.

When $H_{kd}$ changed from 0.16 kA/m to 3.2 kA/m with $H_k$ fixed to 0.16 kA/m, the dependence of $\Delta\theta_{err}$ on $\theta_{dip}$ was determined by simulation. The results are shown in FIG. 24. Like in a case where $H_k$ changed, decrease in $H_{kd}$ resulted in decrease in the dependence of $\Delta\theta_{err}$ on $\theta_{dip}$, providing the minimum $\Delta\theta_{err}$ when $\theta_{dip}$ was substantially in a range of 30-40°. The minimum $\Delta\theta_{err}$ was about 0.04-0.13°. Under the condition that $H_{kd}=H_k$, $\Delta\theta_{err}$ is minimum at $\theta_{dip}=0$. Thus, the reduction of $H_k$ and/or $H_{kd}$ results in reduced angle error.

$H_k$ is decided by a material used for the free layer. Though $H_k$ was 0.16 kA/m ($H_k$ of NiFe generally used for a free layer) in this Example, the use of a material having lower $H_k$ may change coercivity, etc. affecting hysteresis. Though the use of a laminated ferrimagnetic free layer having two ferromagnetic layers via a non-magnetic layer can reduce $H_k$ macroscopically, it may suffer increased branching loss and decreased sensitivity due to the increased film thickness. Further, because the SVGMR device has a limited length, it is not easy to make $H_{kd}$ depending on the device shape close to 0. However, for example, by adjusting the angle $\theta_{dip}$ to the magnetization directions of pinned layers to 40°, increase in $\theta_{err}$ due to the variation of $H_k$ caused by the unevenness of the characteristics of SVGMR films and the variation of $H_{kd}$ caused by the device shape can be suppressed, thereby providing a rotation-angle-detecting apparatus with high detection accuracy.

Example 2

Figure 25:
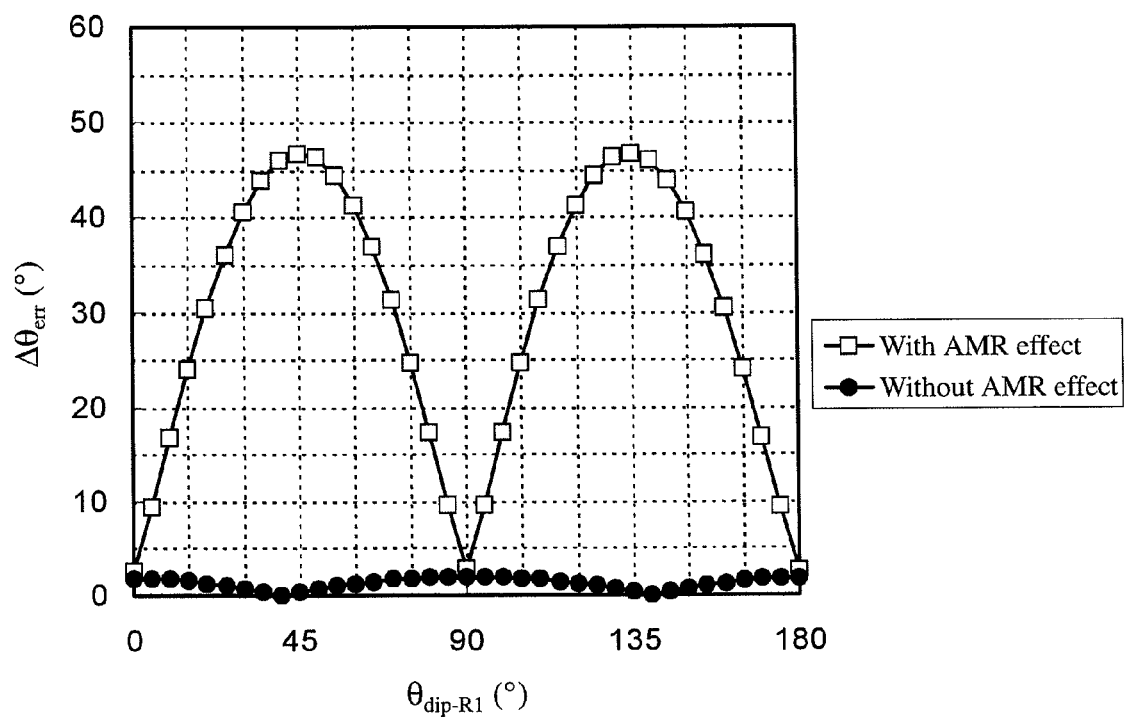
FIG. 25 is a graph showing the relation between $\Delta\theta_{err}$ and $\theta_{dip}$ of a magnetoresistive device when there is an AMR effect and when there is no AMR effect.

To suppress the power consumption of a magnetic sensor by increasing the resistance of the SVGMR device, the device may have a longitudinal length of several tens of micrometers to about 100 µm. Such long device has large shape-induced anisotropy of a free layer in the SVGMR film, the AMR effect of the free layer is not negligible. Thus, in a magnetic sensor having the same device arrangement as in Example 1, $\theta_{dip}$ was changed as shown in Table 3, in which the angle of the device in a counterclockwise direction is expressed with "+," and the value in parentheses was $\theta_{dip}$-180°, when the AMR effect was taken into consideration and when it was not taken into consideration, to determine $\Delta\theta_{err}$ by simulation. The results are shown in FIG. 25. In the formula (8), it was assumed from the thickness ratio of the free layer to the SVGMR film and the specific resistance of the NiFe film that the resistance contributing to AMR was 7500Ω, and dR' was estimated as 22.5Ω assuming that the AMR ratio was 0.3%. Sample 2-5 has the device arrangement described in JP 2003-502876 A and JP 2005-024287 A.

TABLE 3

| | $\theta_{dip}$ (°) of Each Device | | | |
|---|---|---|---|---|
| Sample | $\theta_{dip-R1}$, $\theta_{dip-R3}$ (201a, 201c) | $\theta_{dip-R2}$, $\theta_{dip-R4}$ (201b, 201d) | $\theta_{dip-R5}$, $\theta_{dip-R7}$ (203a, 203c) | $\theta_{dip-R6}$, $\theta_{dip-R8}$ (203b, 203d) |
| 2-1 | 0 | +180 (0) | 0 | +180 (0) |
| 2-2 | +5 | +175 (−5) | +5 | +175 (−5) |
| 2-3 | +30 | +150 (−30) | +30 | +150 (−30) |
| 2-4 | +40 | +140 (−40) | +40 | +140 (−40) |
| 2-5 | +45 | +135 (−45) | +45 | +135 (−45) |
| 2-6 | +85 | +95 (−85) | +85 | +95 (−85) |
| 2-7 | +90 | +90 (−90) | +90 | +90 (−90) |
| 2-8 | +95 (−85) | +85 (−95) | +95 (−85) | +85 (−95) |
| 2-9 | +140 (−40) | +40 (−140) | +140 (−40) | +40 (−140) |
| 2-10 | +175 (−5) | +5 (−175) | +175 (−5) | +5 (−175) |
| 2-11 | +180 (0) | 0 (−180) | +180 (0) | 0 (−180) |

When the AMR effect was taken into consideration, $\Delta\theta_{err}$ was as minimum as about 2.6° in Sample 2-1 ($\theta_{dip}$=0°) and Sample 2-7 ($\theta_{dip}$=90°), and as maximum as about 47° in Sample 2-5 ($\theta_{dip}$=45°). In any device arrangements, current directions are opposite in device pairs (for example, 201a and 201c, and 201b and 201d) in the same bridge, the contribution of the AMR effect to angle error depends on the direction of sensing current and the easy-magnetization axis of the free layer.

Figure 26:
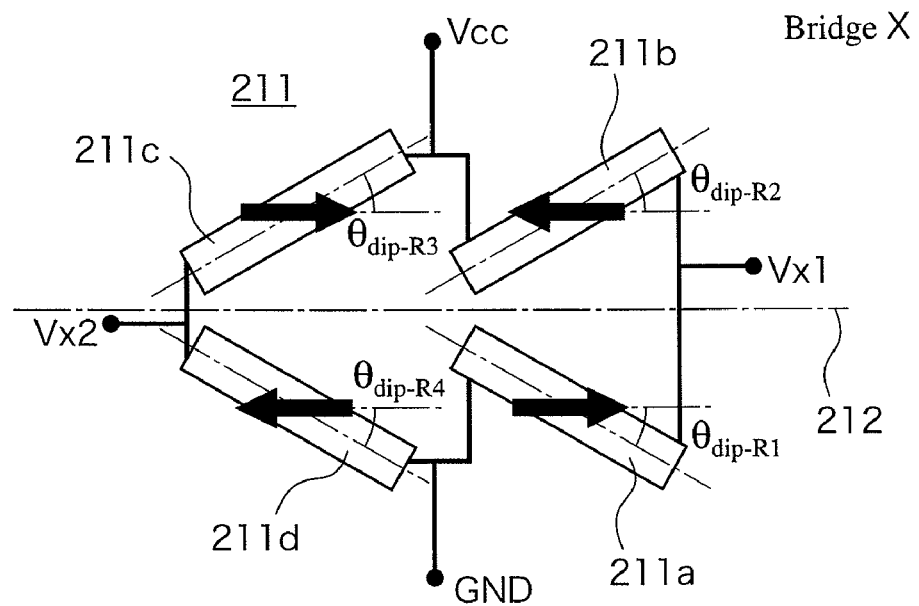
FIG. 26 is a schematic view showing another example of the arrangement of magnetoresistive devices in each bridge circuit.
Figure 26:
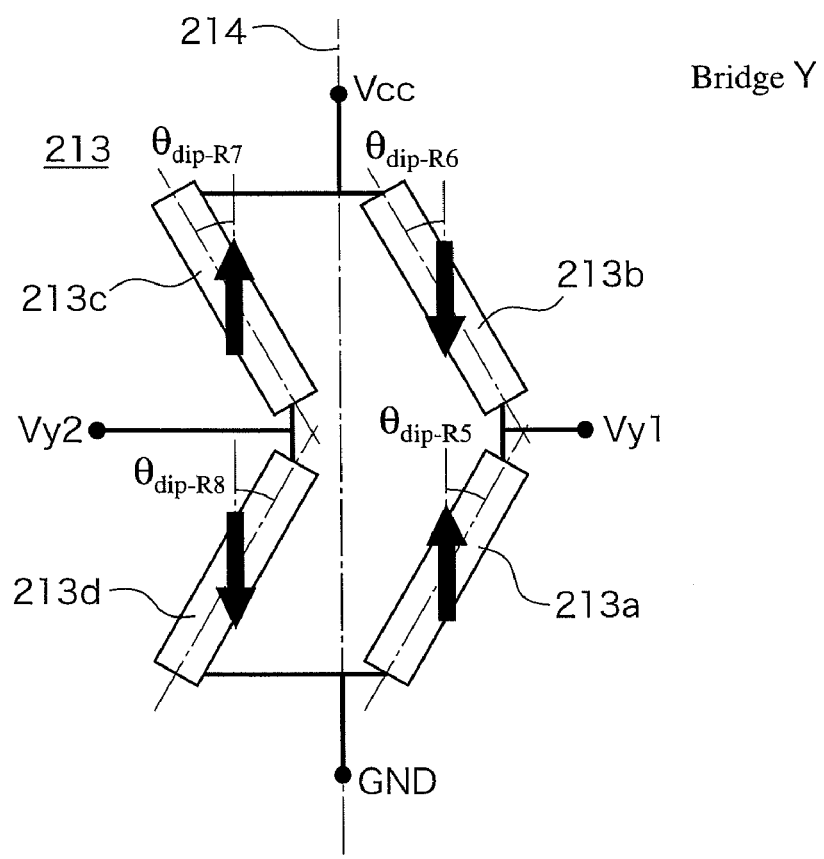

FIG. 26 shows a magnetic sensor effective for suppressing the AMR effect. In FIG. 26, the magnetization directions of pinned layers are horizontal in the bridge circuit X and vertical in the bridge circuit Y. In the bridge circuit X, the devices 211a and 211c have the same magnetization direction of pinned layers, and the devices 211b and 211d have the same magnetization direction of pinned layers. The same is true of the bridge circuit Y. In each bridge, the longitudinal directions of devices comprising pinned layers having the same magnetization direction are nonparallel. The devices 211a-211d, 213a-213d per se are rectangular as in FIG. 16.

The $\theta_{dip}$ of each device in the bridge circuit X (devices 211a-211d) and the bridge circuit Y (devices 213a-213d) is as follows:

$\theta_{dip-R1}$ of device 211a=$\theta_{dip-R4}$ of device 211d,
$\theta_{dip-R2}$ of device 211b=$\theta_{dip-R3}$ of device 211c,
$\theta_{dip-R1}$=−$\theta_{dip-R2}$,
$\theta_{dip-R5}$ of device 213a=$\theta_{dip-R8}$ of device 213d,
$\theta_{dip-R6}$ of device 213b=$\theta_{dip-R7}$ of device 213c, and
$\theta_{dip-R5}$=−$\theta_{dip-R6}$.

Figure 27:
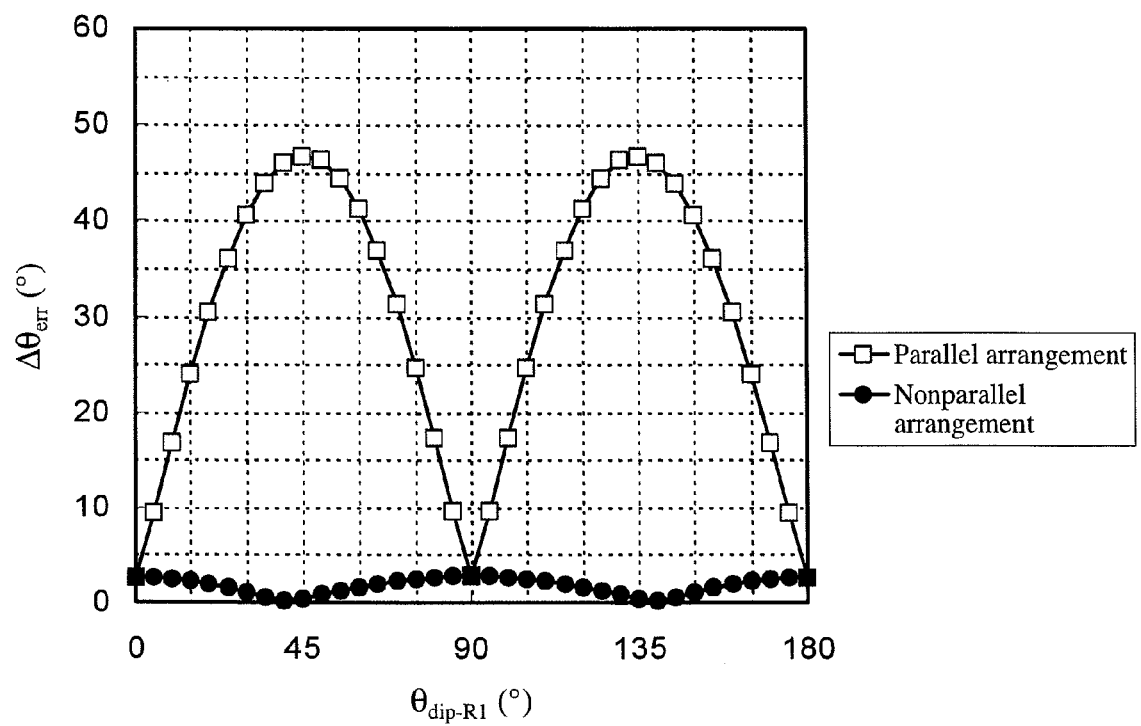
FIG. 27 is a graph showing the dependence of $\Delta\theta_{err}$ on $\theta_{dip}$ when the AMR effect is added, in the case of the parallel and nonparallel arrangements of the magnetoresistive devices.

With the right direction of the bridge circuit X being 0°, and with the upper direction of the bridge circuit Y being 0°, the $\theta_{dip}$ of each device 211a-211d, 213a-213d was changed as shown in Table 4, in which the angle of the device in a clockwise direction is expressed with "+," and the value in parentheses is $\theta_{dip}$-180°, to determine the dependence of $\Delta\theta_{err}$ on $\theta_{dip}$ by simulation when the AMR effect was taken into consideration. The results are shown in FIG. 27. $\Delta\theta_{err}$ when the arrangement angle $\theta_{dip-R1}$ of the device 211a was 35-45° is shown in Table 5.

TABLE 4

| | $\theta_{dip}$ (°) of Each Device | | | |
|---|---|---|---|---|
| Sample | $\theta_{dip-R2}$, $\theta_{dip-R3}$ (211b, 211c) | $\theta_{dip-R1}$, $\theta_{dip-R4}$ (211a, 211d) | $\theta_{dip-R6}$, $\theta_{dip-R7}$ (213b, 213c) | $\theta_{dip-R5}$, $\theta_{dip-R8}$ (213a, 213d) |
| 3-1 | 0 | +180 (0) | 0 | +180 (0) |
| 3-2 | +5 | +175 (−5) | +5 | +175 (−5) |
| 3-3 | +30 | +150 (−30) | +30 | +150 (−30) |
| 3-4 | +40 | +140 (−40) | +40 | +140 (−40) |
| 3-5 | +45 | +135 (−45) | +45 | +135 (−45) |
| 3-6 | +85 | +95 (−85) | +85 | +95 (−85) |
| 3-7 | +90 | +90 (−90) | +90 | +90 (−90) |
| 3-8 | +95 (−85) | +85 (−95) | +95 (−85) | +85 (−95) |
| 3-9 | +140 (−40) | +40 (−140) | +140 (−40) | +40 (−140) |
| 3-10 | +175 (−5) | +5 (−175) | +175 (−5) | +5 (−175) |
| 3-11 | +180 (0) | 0 (−180) | +180 (0) | 0 (−180) |

TABLE 5

| $\theta_{dip-R1}$ | $\Delta\theta_{err}$ (°) |
|---|---|
| 35 | 0.6087 |
| 36 | 0.5139 |
| 37 | 0.4187 |
| 38 | 0.3232 |
| 39 | 0.2275 |
| 40 | 0.1317 |

TABLE 5-continued

| $\theta_{dip-R1}$ | $\Delta\theta_{err}$ (°) |
|---|---|
| 41 | 0.0360 |
| 42 | 0.0595 |
| 43 | 0.1547 |
| 44 | 0.2494 |
| 45 | 0.3435 |

When the longitudinal directions of devices comprising pinned layers having the same magnetization direction were nonparallel in each bridge circuit, namely when two parallel magnetoresistive devices on the side of the power supply terminal were nonparallel to two parallel magnetoresistive devices on the side of the ground terminal in a half bridge, $\Delta\theta_{err}$ was as small as when the AMR effect was not taken into consideration (corresponding to FIG. 17), particularly in Sample 3-4 having $\theta_{dip}$ of 40°, $\Delta\theta_{err}$ was as small as 0.1317°. On the other hand, in Sample 3-5 having an arrangement in which devices comprising pinned layers having the same magnetization direction were perpendicular to each other (Sample 3-5 with $\theta_{dip}$=45°), $\Delta\theta_{err}$ was 0.3435°. This indicates that angle error is smaller in a bridge circuit having $\theta_{dip}$ of 38° or more and less than 45° than in a bridge circuit having $\theta_{dip}$ of 45°. In the case of a magnetic sensor comprising nonparallel devices having the same magnetization direction of pinned layers, the $\theta_{dip}$ is preferably 39-44°, more preferably 40-43°.

Figure 28:
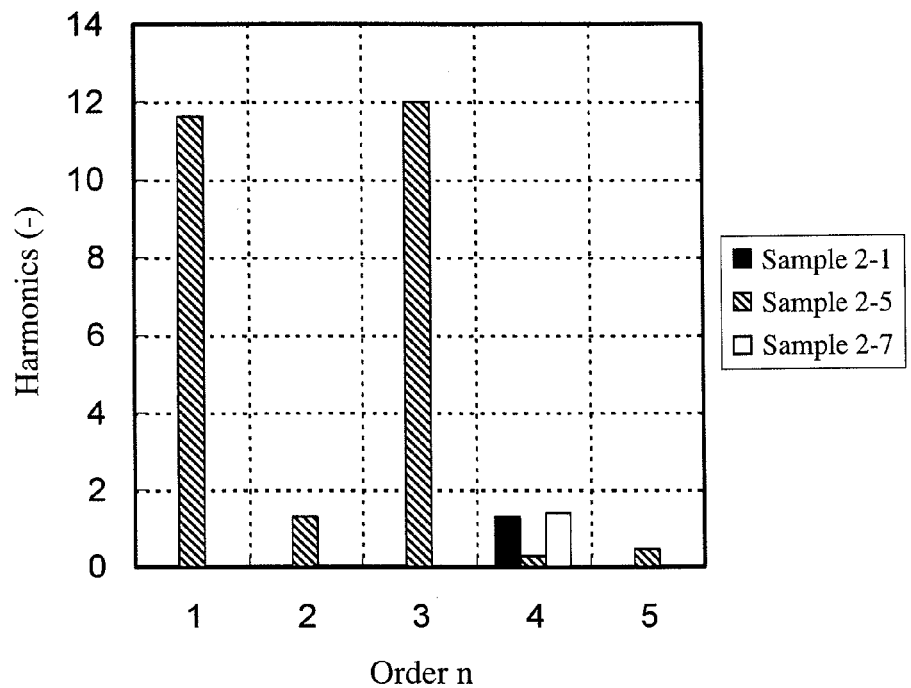
FIG. 28 is a graph showing harmonic components in Samples 2-1, 2-5 and 2-7 with parallel arrangements of magnetoresistive devices.
Figure 29:
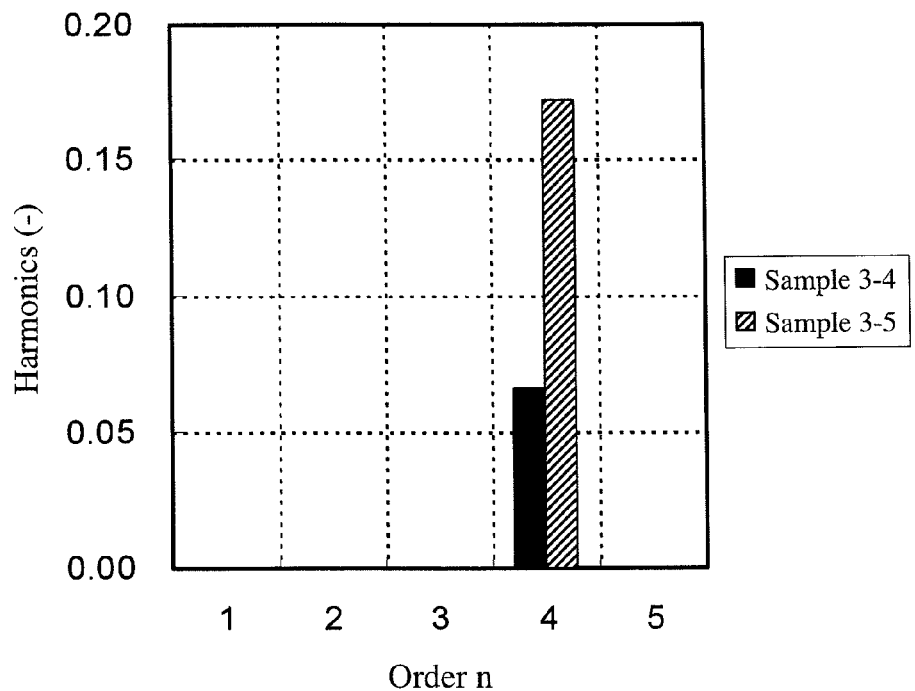
FIG. 29 is a graph showing harmonic components in Samples 3-4 and 3-5 with nonparallel arrangements of magnetoresistive devices.

To make further investigation on the effect of reducing angle error, up to fifth harmonics of $\theta_{err}$ were analyzed. FIG. 28 shows the harmonics analysis results of Samples 2-1, 2-5 and 2-7 having parallel device arrangement, and FIG. 29 shows the harmonics analysis results of Samples 3-4 and 3-5 having nonparallel device arrangement. In the case of the parallel device arrangement, Samples 2-1 and 2-7 having relatively small $\theta_{err}$ generated substantially only a fourth harmonic. On the other hand, Sample 2-5 having large $\theta_{err}$ generated all of up to fifth harmonics, first and third harmonics being particularly large. Though the AMR effect must appear as a fourth harmonic from the formula (8), it is presumed that a large third harmonic was generated due to the device arrangement. Both of Samples 3-4 and 3-5 having nonparallel device arrangement generated substantially no harmonics other than the fourth harmonic, and Sample 3-4 generated an extremely smaller fourth harmonic.

Figure 30:
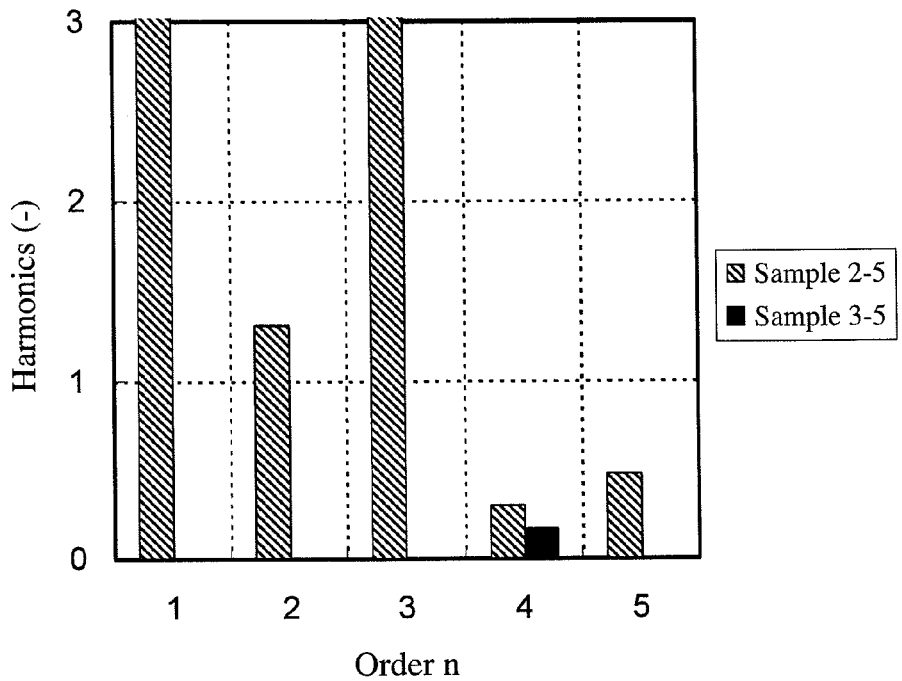
FIG. 30 is a graph showing harmonic components in Samples 2-5 and 3-5.

FIG. 30 shows the harmonics of Sample 2-5 having $\theta_{dip}$ of 45° and parallel device arrangement, and Sample 3-5 having $\theta_{dip}$ of 45° and nonparallel device arrangement. Sample 3-5 having nonparallel device arrangement generated substantially no harmonics other than the fourth harmonic, and its fourth harmonic was substantially half of that of Sample 2-5 having parallel device arrangement. This indicates that the reduction of $\theta_{err}$ needs the reduction of first or third harmonics to substantially 0, and the extreme reduction of a fourth harmonic.

Example 3

Figure 31:
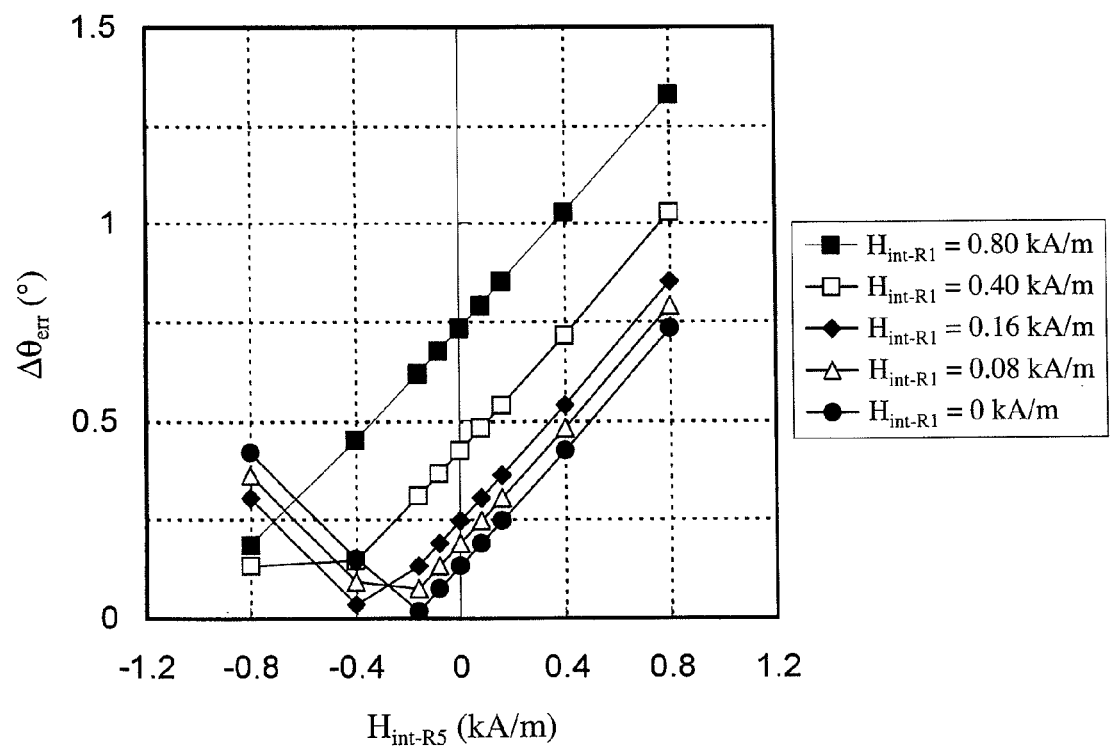
FIG. 31 is a graph showing the relation between $\Delta\theta_{err}$ and $H_{int-R5}$ of the magnetoresistive device in each $H_{int-R1}$.

The most variable magnetic property of the SVGMR film is $H_{int}$ (a magnetic field acting between the pinned layer and the free layer via the intermediate layer). $H_{int}$ is variable depending on a so-called "orange peel effect" due to the thickness fluctuation and surface roughness of the intermediate layer, and temperatures such as an operation temperature, an ambient temperature, etc. To find the relation between $H_{int}$ and $\Delta\theta_{err}$ under the optimum device arrangement conditions (Sample 3-4), $\Delta\theta_{err}$ was calculated by simulation at $H_{int-R1}$ of 0 kA/m, 0.08 kA/m, 0.16 kA/m, 0.40 kA/m and 0.80 kA/m, respectively, with the $H_{int}(H_{int-R5})$ of the device 213a was changed from −0.8 kA/m to +0.8 kA/m under the following conditions in the magnetic sensor shown in FIG. 26. The results are shown in FIG. 31.

$H_{int-R1}$ of device 211a=$H_{int-R4}$ of device 211d,
$H_{int-R2}$ of device 211b=$H_{int-R3}$ of device 211c,
$H_{int-R1}$=−$H_{int-R2}$,
$H_{int-R5}$ of device 213a=$H_{int-R8}$ of device 213d,
$H_{int-R6}$ of device 213b=$H_{int-R7}$ of device 213c, and
$H_{int-R5}$=−$H_{int-R6}$.

Smaller $\Delta\theta_{err}$ was obtained with smaller $H_{int-R1}$, and $\Delta\theta_{err}$ was substantially minimum when the sign of $H_{int-R5}$ was reversed. When $H_{int-R1}$ was 0.16 kA/m or less, $\Delta\theta_{err}$ was 1° or less, and even when $H_{int-R1}$ was 0.4 kA/m or more, $\Delta\theta_{err}$ was 1° or less as long as $H_{int-R5}$ was within ±0.4 kA/m. This indicates that angle error can be suppressed as long as the variation of $H_{int}$ is within ±0.4 kA/m in the magnetic sensor of the present invention, thereby obtaining magnetic sensors with small angle errors even with the thickness variation of intermediate layers and the variation of $H_{int}$ at high temperatures.

Example 4

Figure 32:
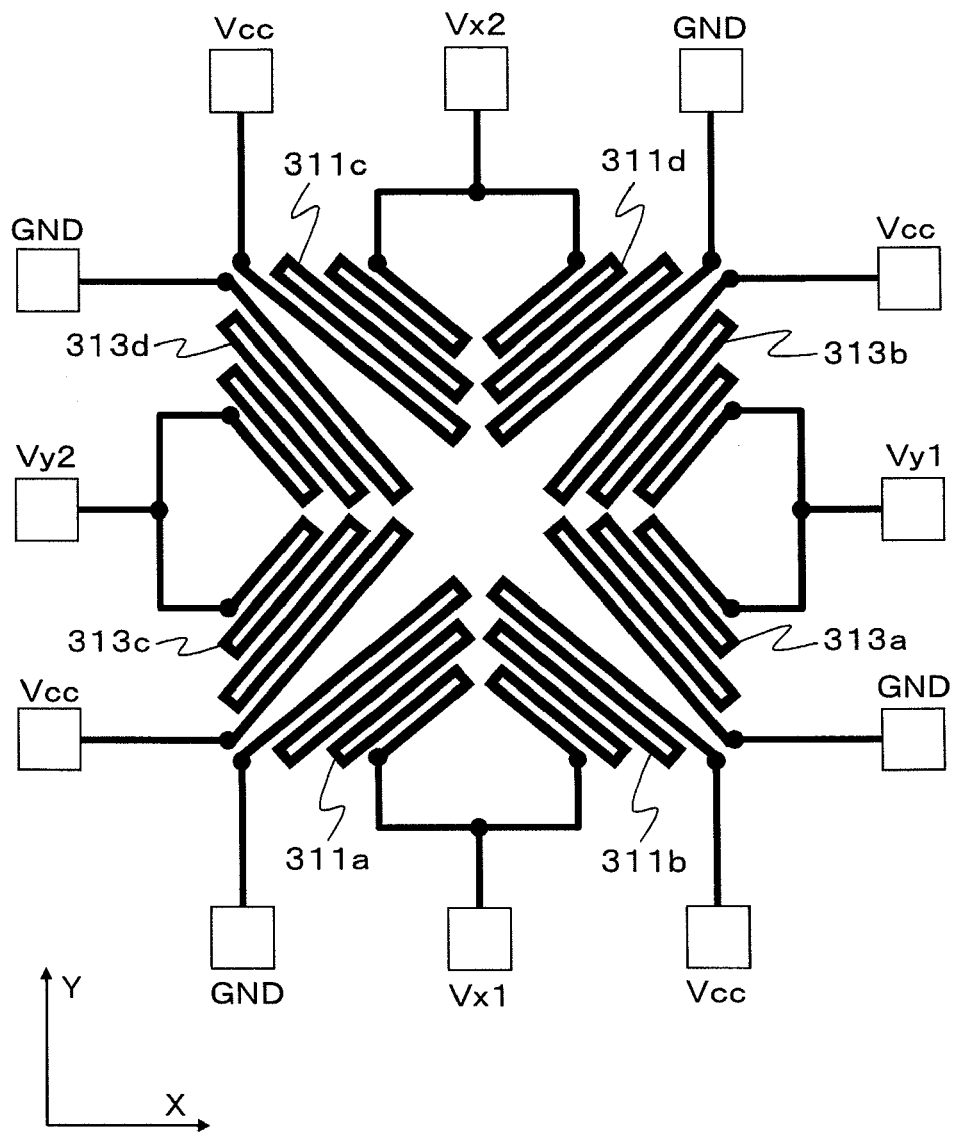
FIG. 32 is a schematic view showing one example of the arrangements of magnetoresistive devices constituting the bridge circuit.
Figure 33:
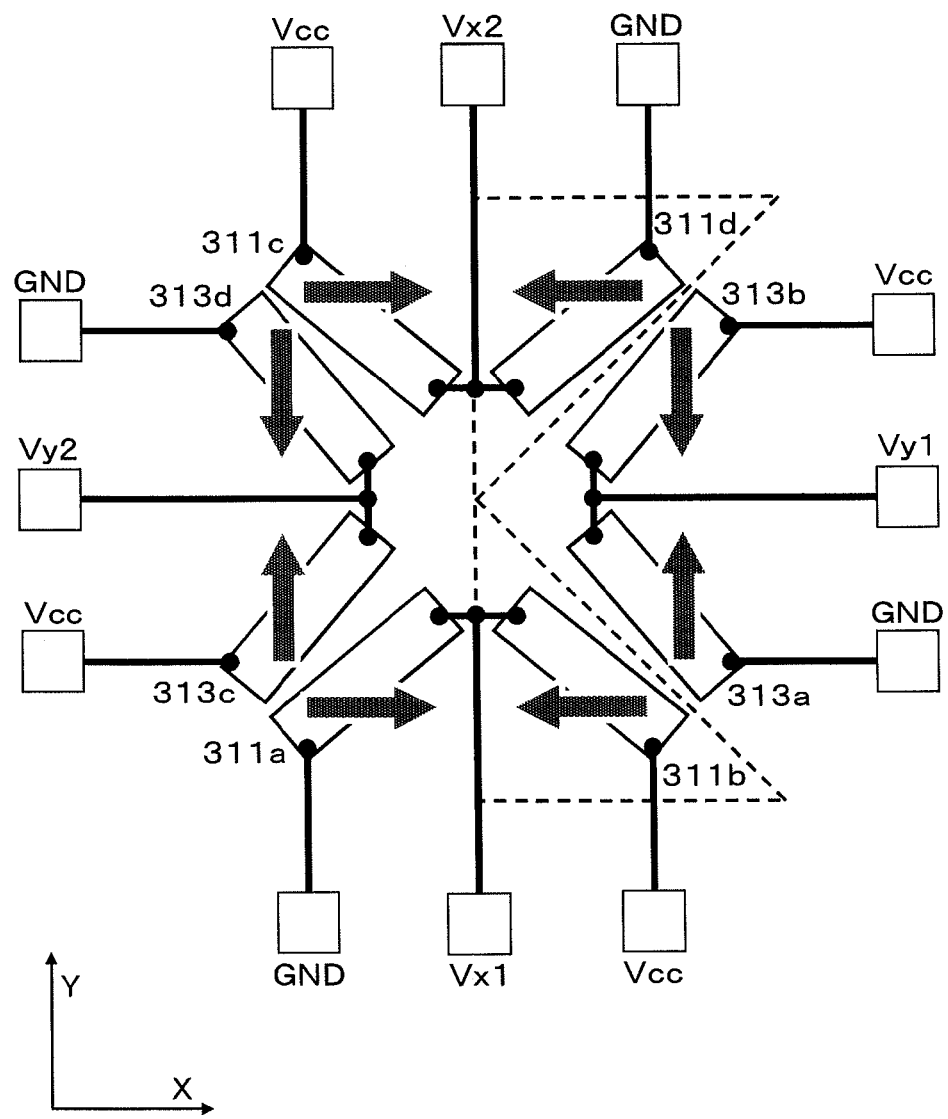
FIG. 33 is a schematic view showing one example of the relations between the arrangement of magnetoresistive devices constituting the bridge circuit and the magnetization directions of pinned layers.

FIG. 32 shows a specific device arrangement example in the bridge circuit shown in FIG. 26. In the figure, the arrows X and Y indicate the side directions of a sensor chip comprising devices. FIG. 33 schematically shows the device arrangement of FIG. 32 with the magnetization directions of pinned layers shown by the arrows. Devices 311a and 311c having the same magnetization direction of pinned layers, and devices 311b and 311d having the same magnetization direction of pinned layers (surrounded by dotted line as Example), etc. are inclined to the magnetization directions of pinned layers by desired angles (for example, ±40°). However, because the devices 311a and 311c, and the devices 311b and 311d are respectively not parallel, the AMR effect is canceled.

Figure 34:
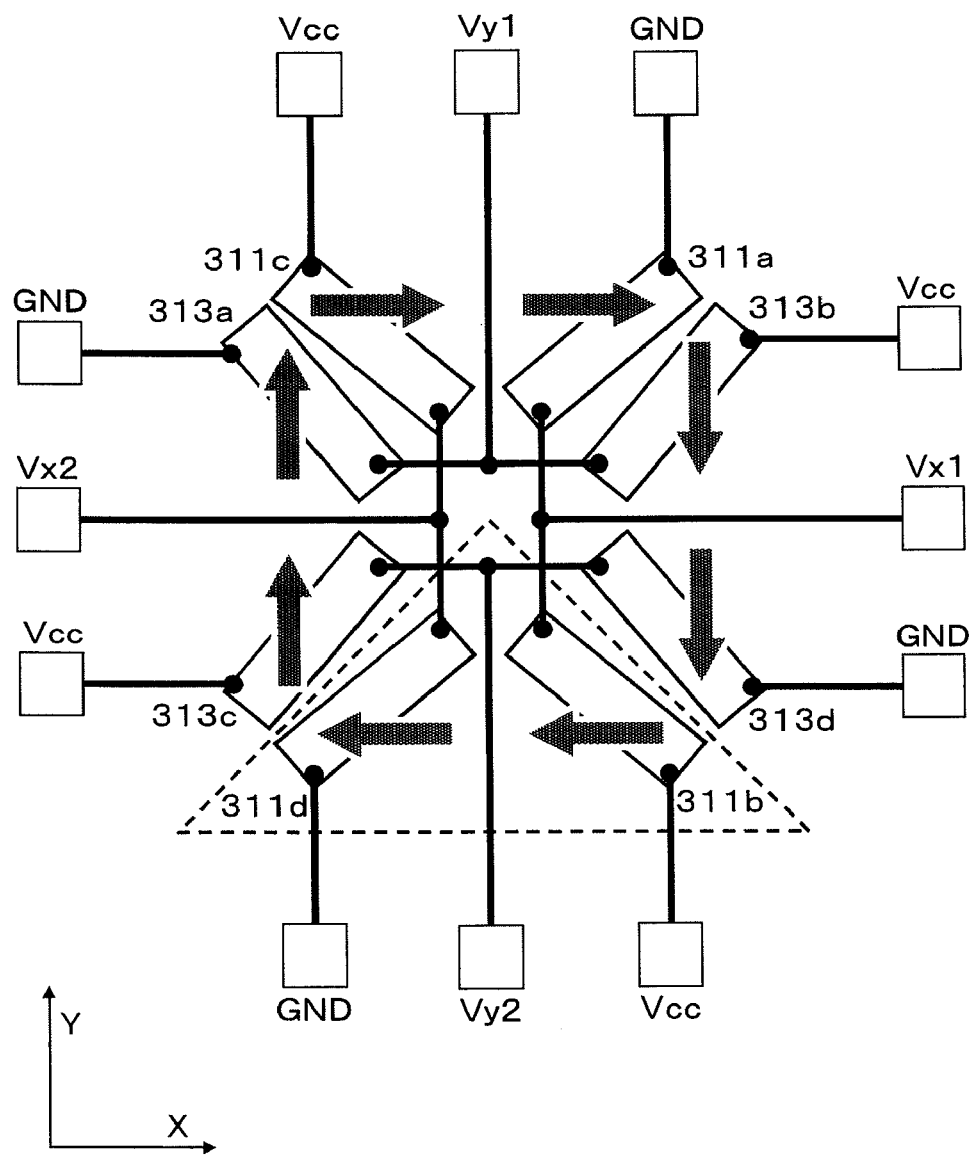
FIG. 34 is a schematic view showing another example of the relations between the arrangement of magnetoresistive devices constituting the bridge circuit and the magnetization directions of pinned layers.
Figure 35:
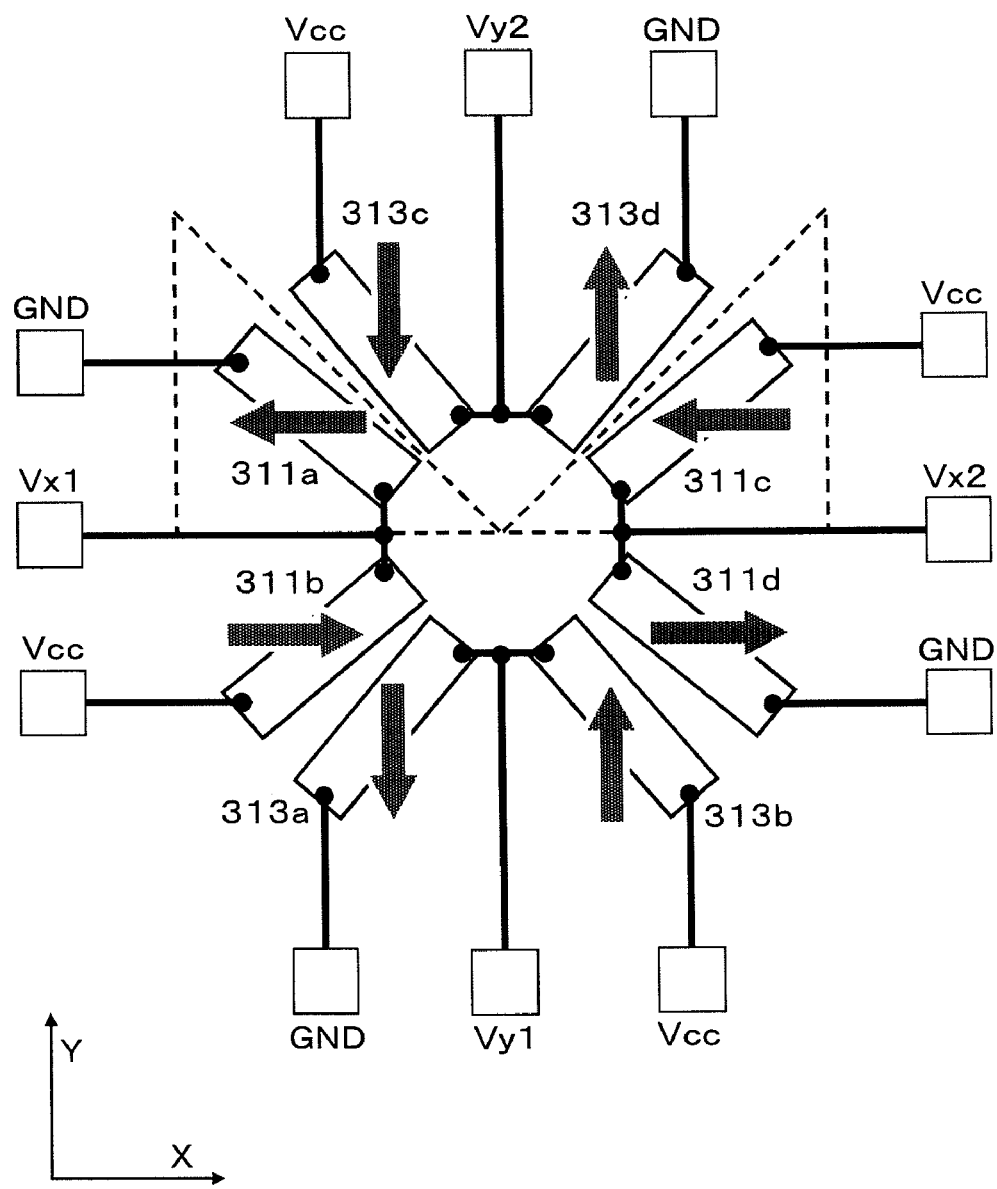
FIG. 35 is a schematic view showing a further example of the relations between the arrangement of magnetoresistive devices constituting the bridge circuit and the magnetization directions of pinned layers.
Figure 36:
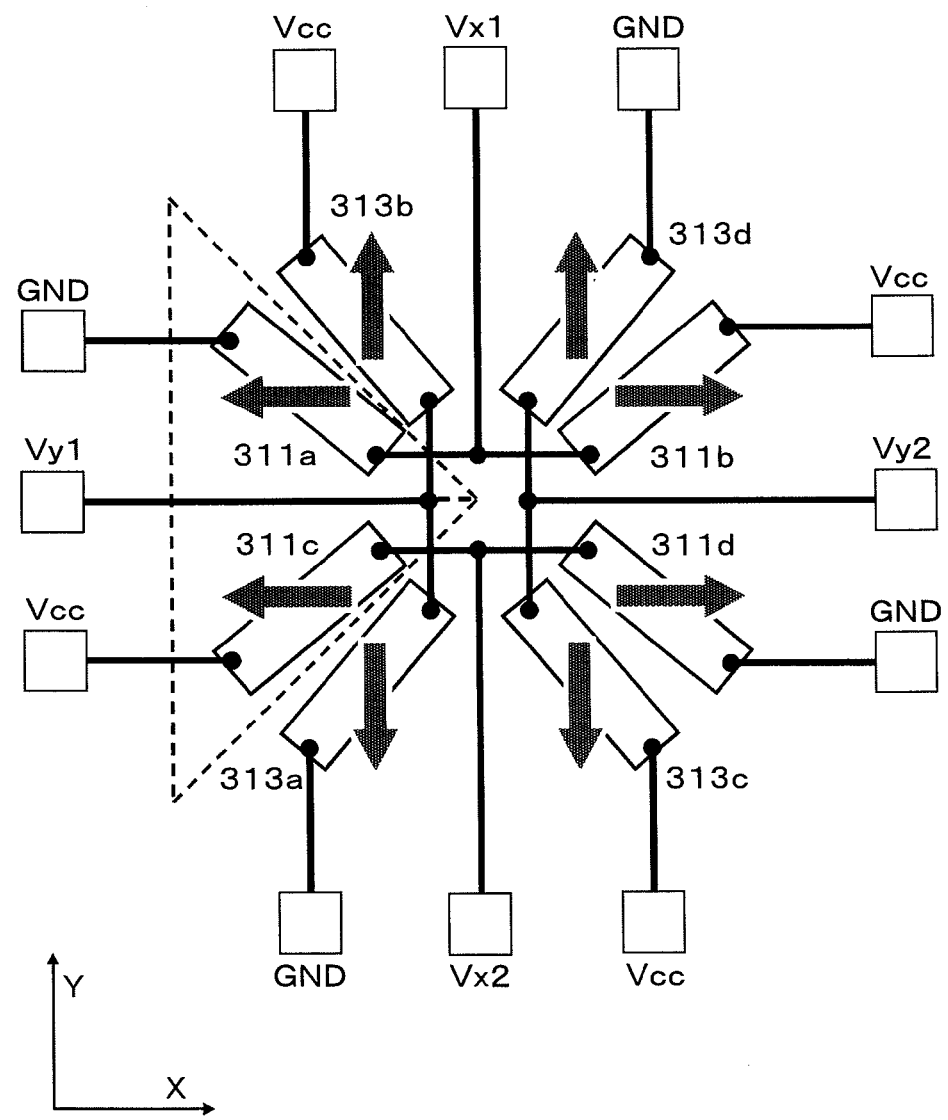
FIG. 36 is a schematic view showing a still further example of the relations between the arrangement of magnetoresistive devices constituting the bridge circuit and the magnetization directions of pinned layers.

Because the devices 311c and 311b, and the devices 313a and 313d are equivalent in FIG. 33, the interchange of the devices 313a and 313d does not change the relation between the longitudinal direction of the device and the magnetization directions of pinned layers as shown in FIG. 34. There is an insulating layer in wire-crossing portions for insulation between the bridges. FIGS. 35 and 36 show another example of device arrangements. Though the examples of FIGS. 35 and 36 differ from the example shown in FIG. 33 with respect to an angle between adjacent devices, they are equal with respect to the relation between the longitudinal direction of the device and the magnetization directions of pinned layers.

Figure 37:
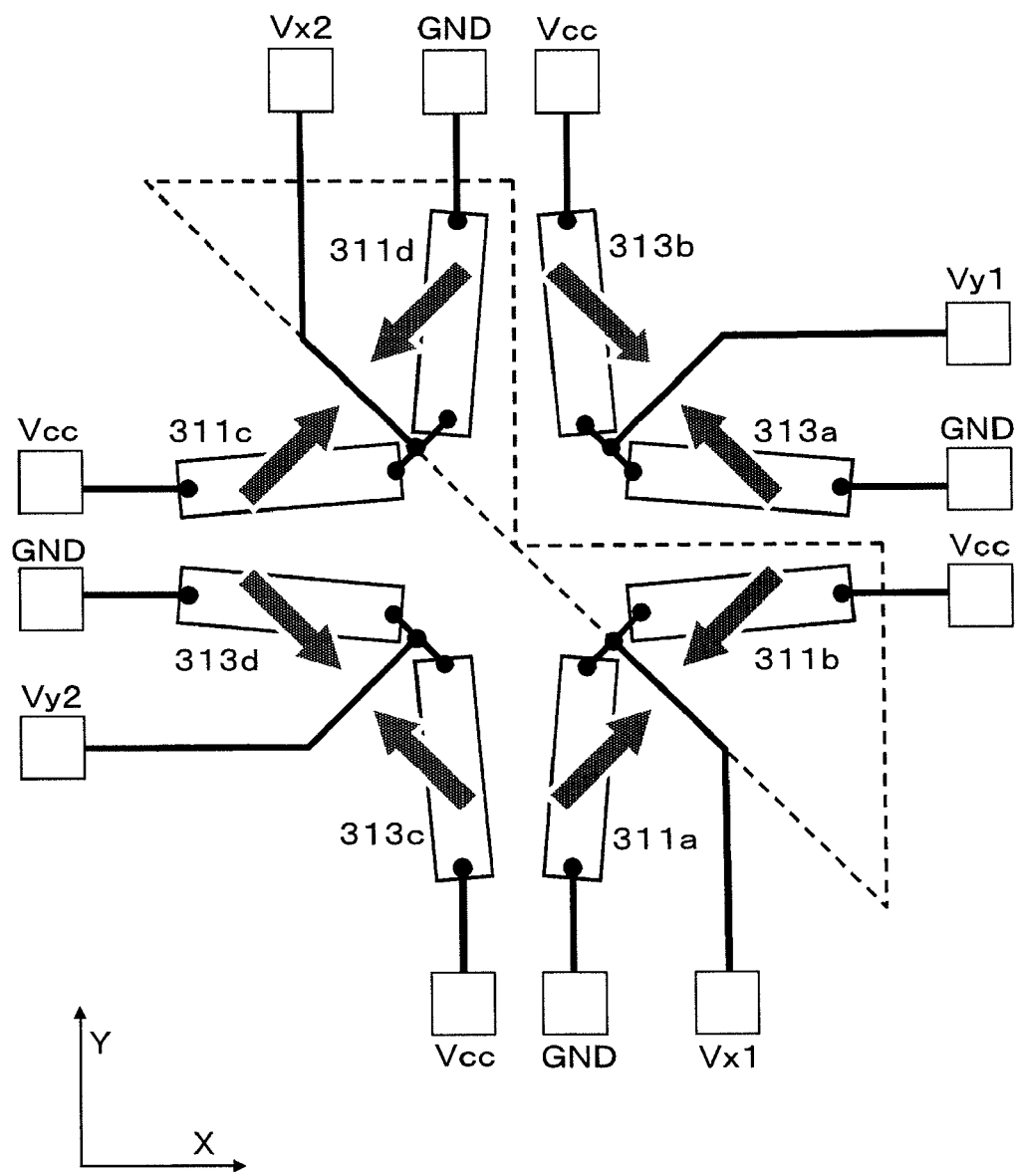
FIG. 37 is a schematic view showing a still further example of the relations between the arrangement of magnetoresistive devices constituting the bridge circuit and the magnetization directions of pinned layers.
Figure 38:
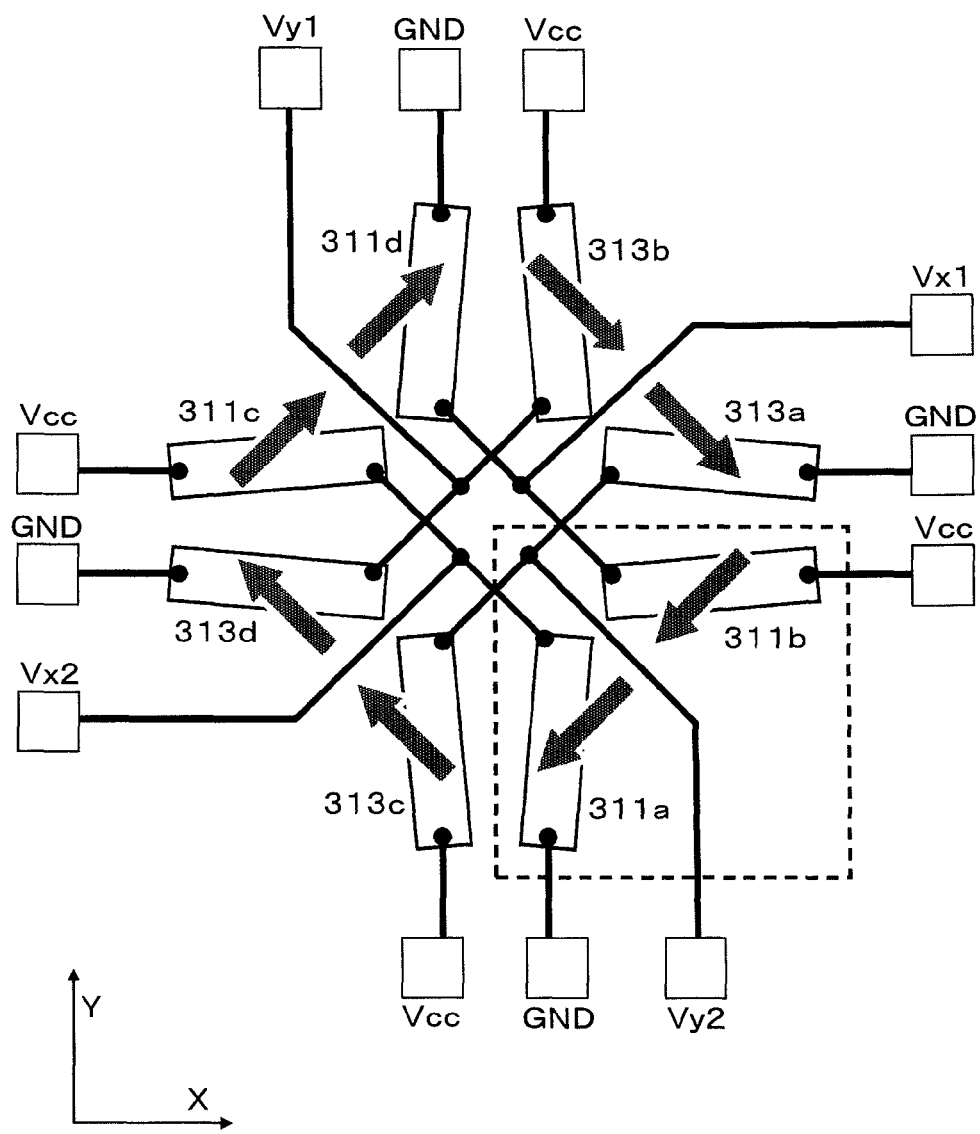
FIG. 38 is a schematic view showing a still further example of the relations between the arrangement of magnetoresistive devices constituting the bridge circuit and the magnetization directions of pinned layers.
Figure 39:
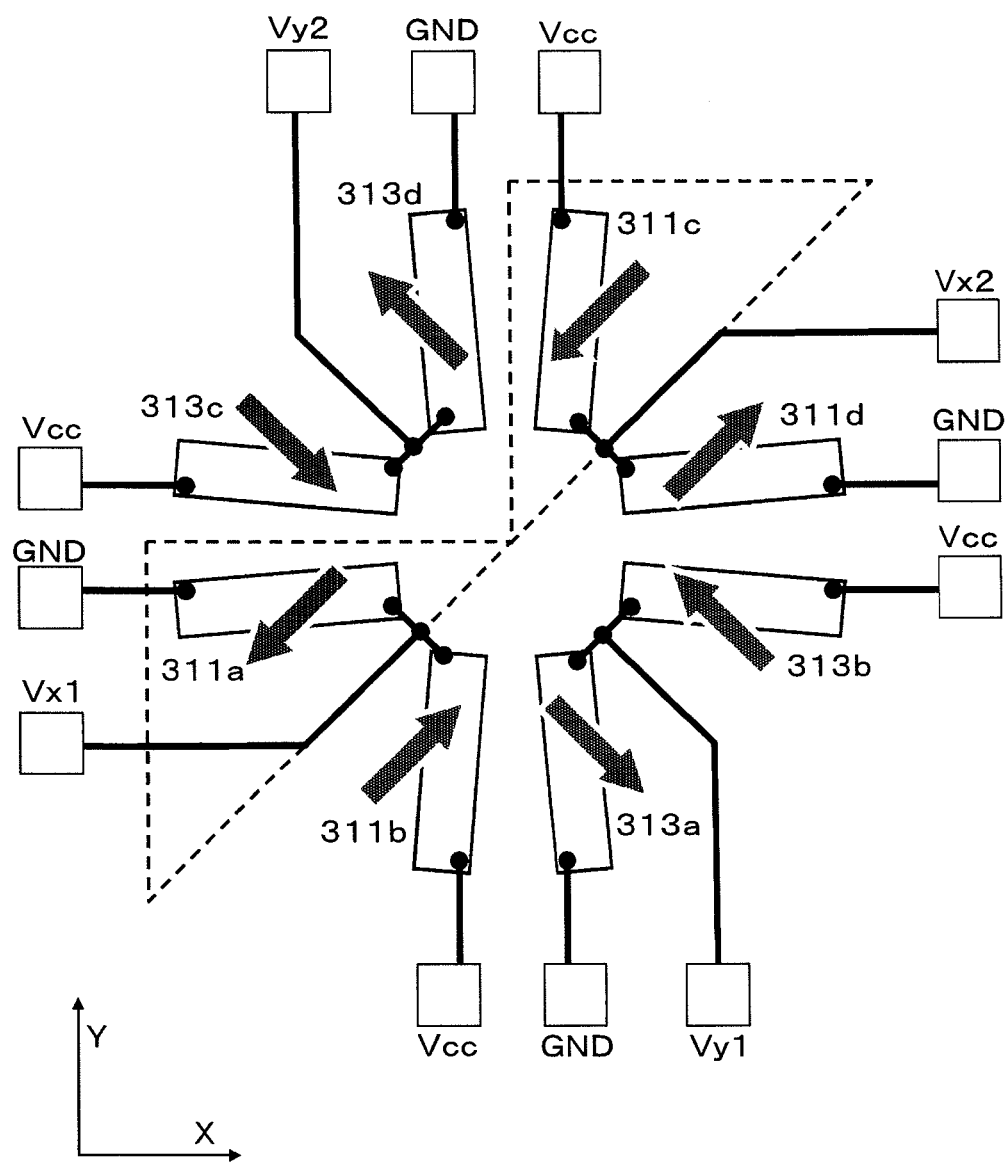
FIG. 39 is a schematic view showing a still further example of the relations between the arrangement of magnetoresistive devices constituting the bridge circuit and the magnetization directions of pinned layers.
Figure 40:
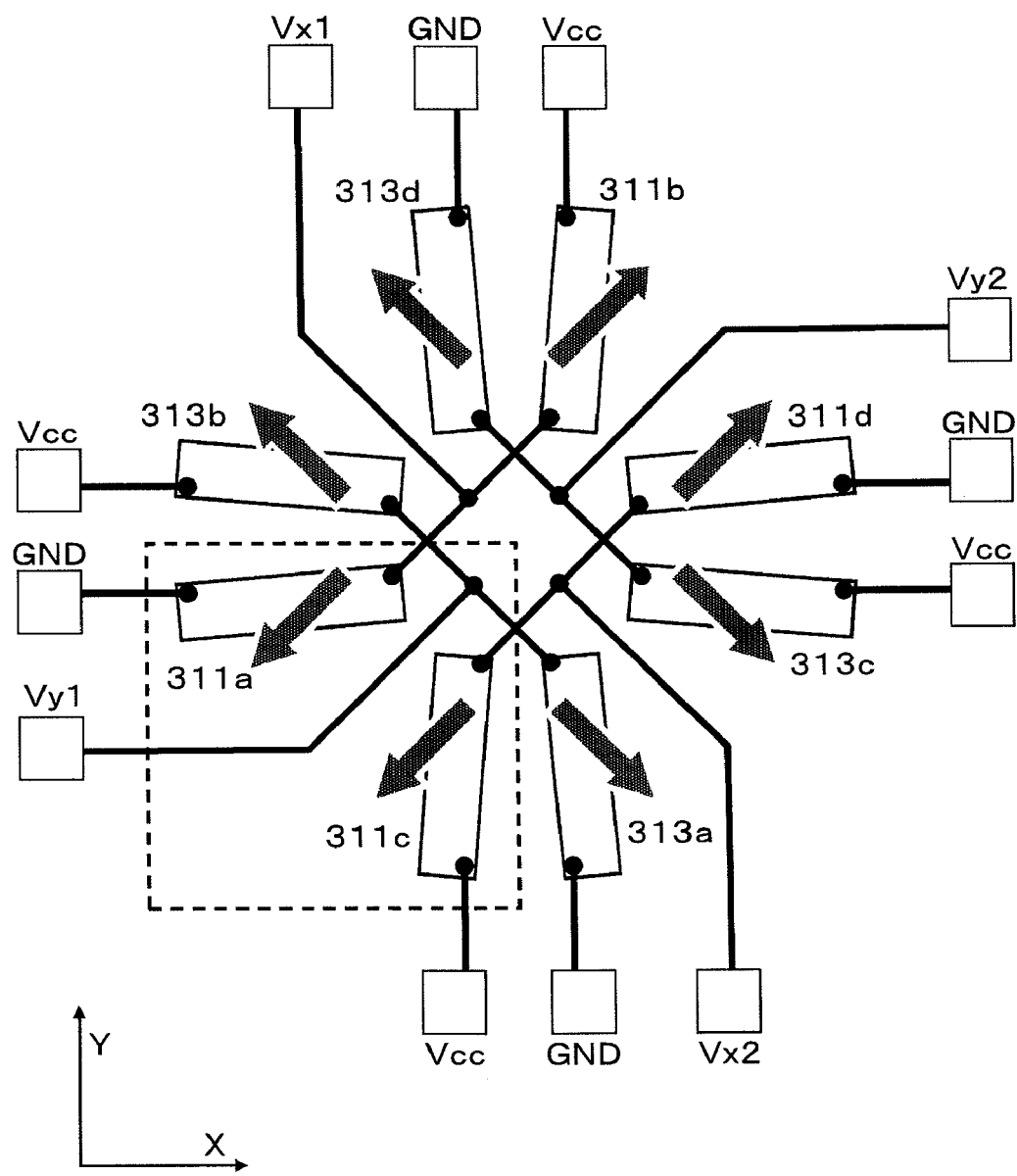
FIG. 40 is a schematic view showing a still further example of the relations between the arrangement of magnetoresistive devices constituting the bridge circuit and the magnetization directions of pinned layers.
Figure 41:
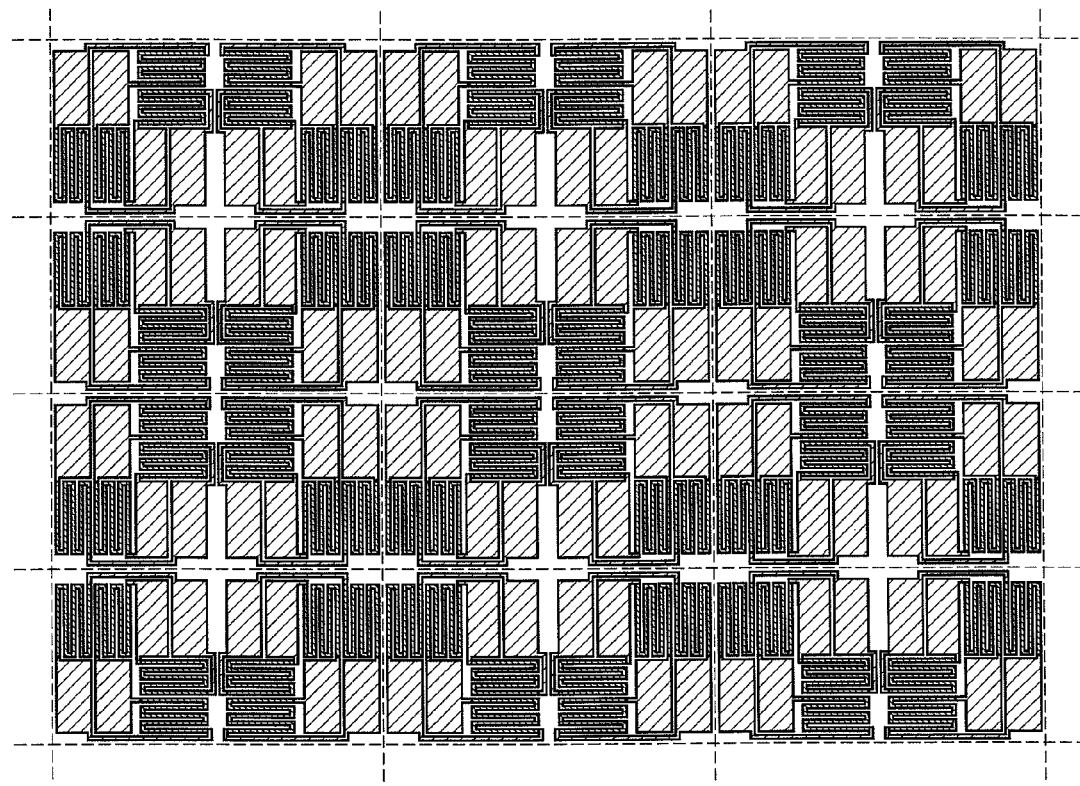
FIG. 41 is a plan view showing the arrangement of magnetoresistive devices described in JP 2003-502876 A.
Figure 42:
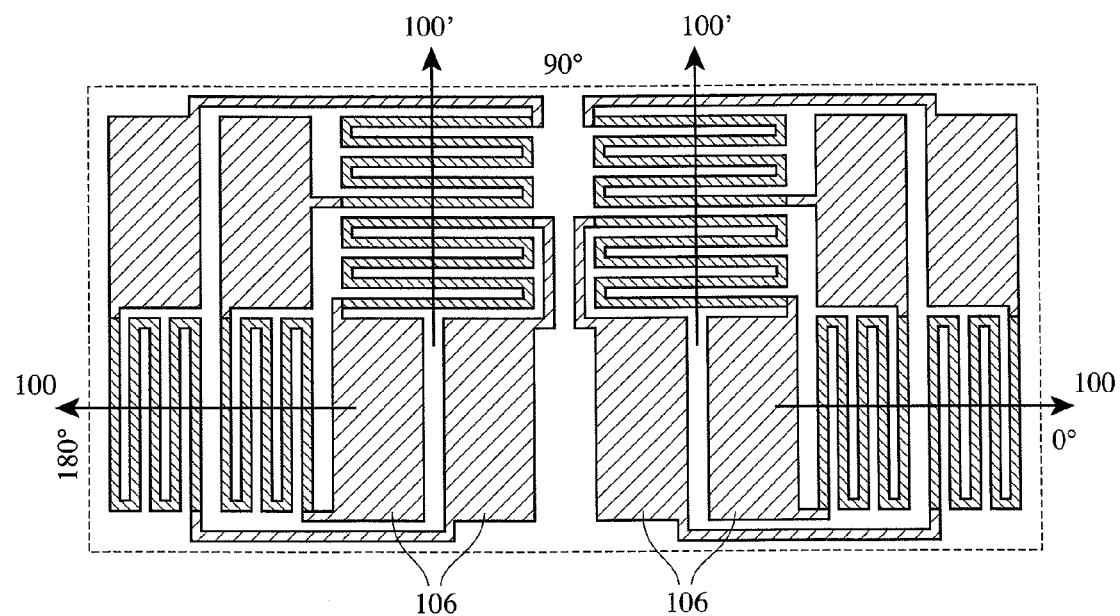
FIG. 42 is an enlarged view showing a portion of FIG. 41.

The exchange of such devices has been enabled by SVGMR films whose pinned layers have magnetization directions that can be freely designed at film-forming, and the use of film-forming apparatuses in which magnetic field directions can be arbitrarily set at film-forming further increases the freedom of device arrangement. FIG. 37 shows a bridge circuit obtained by rotating the device of FIG. 33 by 45° in a plane. The rotation of each device by 45° from FIG. 33 enables denser device arrangement. Namely, the optimization of the relation between the longitudinal directions of the devices and the magnetization directions of pinned layers provides a magnetic sensor and a rotation-angle-detecting apparatus highly resistant to the variation of characteristics of an SVGMR film, and capable of having free device arrangement, small output distortion, and reduced angle error. The magnetization direction of the structure shown in FIG. 37 can partially be changed as shown in FIG. 38. FIGS. 39 and 40 show further examples.

EFFECT OF THE INVENTION

The rotation-angle-detecting apparatus of the present invention can reduce angle error due to the production unevenness, etc. of the magnetic sensor, by adjusting the signals (Vx−Vy) and (Vx+Vy) obtained from the output voltage Vx of a bridge circuit X and the output voltage Vy of a bridge circuit Y to have the same amplitude, and then conducting the arctangent calculation of (Vx−Vy)/(Vx+Vy).

What is claimed is:

1. A rotation-angle-detecting apparatus comprising a magnet rotor, a magnetic sensor detecting the direction of magnetic flux from said magnet rotor, a correction circuit, and an angle-calculating circuit,
    said magnetic sensor having a bridge circuit X comprising four connected magnetoresistive devices and a bridge circuit Y comprising four connected magnetoresistive devices,
    each of said magnetoresistive devices comprising a spin-valve, giant-magnetoresistive film comprising a pinned layer having a magnetization direction fixed in one direction, a free layer whose magnetization direction is variable to be in alignment with the direction of an external magnetic field, and an intermediate layer sandwiched by said pinned layer and said free layer,
    said correction circuit calculating difference (Vx−Vy) and sum (Vx+Vy) from the output voltage Vx of said bridge circuit X and the output voltage Vy of said bridge circuit Y, and making their amplitudes equal to each other, and
    said angle-calculating circuit conducting the arctangent calculation of (Vx−Vy)'/(Vx+Vy)' obtained from a signal (Vx−Vy)' and a signal (Vx+Vy)' supplied with the same amplitude from said correction circuit, to determine the rotation angle of said magnet rotor.

2. A rotation-angle-detecting apparatus comprising a magnet rotor, a magnetic sensor detecting the direction of magnetic flux from said magnet rotor, operational amplifier circuits, a correction circuit, and an angle-calculating circuit,
    said magnetic sensor having a bridge circuit X comprising four connected magnetoresistive devices and a bridge circuit Y comprising four connected magnetoresistive devices,
    each of said magnetoresistive devices comprising a spin-valve, giant-magnetoresistive film comprising a pinned layer having a magnetization direction fixed in one direction, a free layer whose magnetization direction is variable to be in alignment with the direction of an external magnetic field, and an intermediate layer sandwiched by said pinned layer and said free layer,
    said operational amplifier circuits calculating difference (Vx−Vy) and sum (Vx+Vy) from the output voltage Vx of said bridge circuit X and the output voltage Vy of said bridge circuit Y,
    said correction circuit making the amplitudes of the signals (Vx−Vy) and (Vx+Vy) supplied from said operational amplifier circuits equal to each other, and
    said angle-calculating circuit conducting the arctangent calculation of (Vx−Vy)'/(Vx+Vy)' obtained from a signal (Vx−Vy)' and a signal (Vx+Vy)' supplied with the same amplitude from said correction circuit, to determine the rotation angle of said magnet rotor.

3. The rotation-angle-detecting apparatus according to claim 1, wherein at least one longitudinal direction of said magnetoresistive device is inclined to the magnetization directions of pinned layers therein by an acute angle θ meeting the condition of 36°≦θ<45°.

4. The rotation-angle-detecting apparatus according to claim 1, wherein among four magnetoresistive devices in each of said bridge circuit X and said bridge circuit Y, two magnetoresistive devices are inclined to the magnetization directions of pinned layers by an acute angle θ, while the remaining two magnetoresistive devices are inclined by an acute angle −θ.

* * * * *